(12) United States Patent
Labrou et al.

(10) Patent No.: US 7,784,684 B2
(45) Date of Patent: Aug. 31, 2010

(54) WIRELESS COMPUTER WALLET FOR PHYSICAL POINT OF SALE (POS) TRANSACTIONS

(75) Inventors: Yannis Labrou, Baltimore, MD (US); Jonathan Russell Agre, Brinklow, MD (US)

(73) Assignee: Fujitsu Limited, Kawasaki (JP)

( * ) Notice: Subject to any disclaimer, the term of this patent is extended or adjusted under 35 U.S.C. 154(b) by 948 days.

(21) Appl. No.: 11/488,178

(22) Filed: Jul. 18, 2006

(65) Prior Publication Data

US 2007/0022058 A1    Jan. 25, 2007

Related U.S. Application Data

(63) Continuation-in-part of application No. 11/388,202, filed on Mar. 24, 2006, now Pat. No. 7,606,560, and a continuation-in-part of application No. 11/045,484, filed on Jan. 31, 2005, and a continuation-in-part of application No. 10/458,205, filed on Jun. 11, 2003, now Pat. No. 7,353,382, and a continuation-in-part of application No. 10/628,584, filed on Jul. 29, 2003, and a continuation-in-part of application No. 10/628,569, filed on Jul. 29, 2003, now Pat. No. 7,349,871, and a continuation-in-part of application No. 10/628,583, filed on Jul. 29, 2003.

(60) Provisional application No. 60/703,862, filed on Aug. 1, 2005, provisional application No. 60/669,375, filed on Apr. 8, 2005, provisional application No. 60/544,300, filed on Feb. 17, 2004, provisional application No. 60/401,807, filed on Aug. 8, 2002.

(51) Int. Cl.
*G06K 5/00* (2006.01)

(52) U.S. Cl. .................. 235/380; 235/375; 705/64; 705/75

(58) Field of Classification Search .................. 235/380, 235/375, 381, 462.45, 492, 472.01; 705/64, 705/75
See application file for complete search history.

(56) References Cited

U.S. PATENT DOCUMENTS 4,182,261 A    1/1980   Smith, III et al.

(Continued)

FOREIGN PATENT DOCUMENTS

DE    103 10 527    9/2004

(Continued)

OTHER PUBLICATIONS

Mobile, 1992, Academic Press Dictionary of Science and Technology, http://xreferplus.com/entry.jsp?xrefid=3130947&secid=.&hh=1.*

(Continued)

*Primary Examiner*—Edwyn Labaze
(74) *Attorney, Agent, or Firm*—Staas & Halsey LLP

(57) ABSTRACT

Methods and systems provide a secure transaction server (STS); provide an authentic point of sale (POS) device, according to a first authentication parameter of the STS; provide an authentic mobile purchasing device, according to a second authentication parameter of the STS; provide a short-range communication method between the POS device and the mobile purchasing device; correlate by the STS a personal identification entry (PIE) and the authentic mobile purchasing device; transmit, by the POS device, a time dependent transformed secure POS authenticable POS purchase action to the STS; input the PIE to the mobile purchasing device to transmit a time dependent transformed secure user authenticable POS purchase action to the POS device via the short-range communication method; and approve, by the STS, the POS purchase action for the POS device and for the mobile purchasing device, according to the authentic POS device, and according to the authentic mobile purchasing device and the STS correlating of the PIE and the authentic mobile purchasing device.

23 Claims, 16 Drawing Sheets

U.S. PATENT DOCUMENTS

| | | | |
|---|---|---|---|
| 4,253,086 A | 2/1981 | Szwarcbier | |
| 4,582,985 A | 4/1986 | Lofberg | |
| 4,636,622 A | 1/1987 | Clark | |
| 4,882,195 A | 11/1989 | Butland | |
| 5,095,194 A | 3/1992 | Barbanell | |
| 5,194,289 A | 3/1993 | Butland | |
| 5,239,166 A | 8/1993 | Graves | |
| 5,256,863 A | 10/1993 | Ferguson et al. | |
| 5,363,453 A | 11/1994 | Gagne et al. | |
| 5,465,328 A * | 11/1995 | Dievendorff et al. | 714/15 |
| 5,485,312 A | 1/1996 | Horner et al. | |
| 5,521,980 A | 5/1996 | Brands | |
| 5,598,474 A | 1/1997 | Johnson | |
| 5,631,961 A | 5/1997 | Mills et al. | |
| 5,644,118 A | 7/1997 | Hayashida | |
| 5,666,420 A | 9/1997 | Micali | |
| 5,732,148 A | 3/1998 | Keagy et al. | |
| 5,790,677 A | 8/1998 | Fox et al. | |
| 5,794,204 A | 8/1998 | Walker et al. | |
| 5,869,822 A | 2/1999 | Meadows, II et al. | |
| 5,913,203 A * | 6/1999 | Wong et al. | 705/39 |
| 5,917,168 A | 6/1999 | Nakamura et al. | |
| 5,949,043 A | 9/1999 | Hayashida | |
| 5,956,404 A | 9/1999 | Schneier et al. | |
| 6,003,762 A | 12/1999 | Hayashida | |
| 6,003,767 A | 12/1999 | Hayashida | |
| 6,006,328 A | 12/1999 | Drake | |
| 6,010,068 A | 1/2000 | Bozzo | |
| 6,032,258 A | 2/2000 | Godoroja et al. | |
| 6,044,388 A * | 3/2000 | DeBellis et al. | 708/254 |
| 6,067,621 A | 5/2000 | Yu et al. | |
| 6,069,969 A | 5/2000 | Keagy et al. | |
| 6,081,793 A | 6/2000 | Challener et al. | |
| 6,098,053 A | 8/2000 | Slater | |
| 6,115,601 A | 9/2000 | Ferreira | |
| 6,137,884 A | 10/2000 | Micali | |
| 6,163,771 A | 12/2000 | Walker et al. | |
| 6,175,922 B1 | 1/2001 | Wang | |
| 6,175,923 B1 | 1/2001 | Bailey | |
| 6,182,892 B1 | 2/2001 | Angelo et al. | |
| 6,199,099 B1 | 3/2001 | Gershman et al. | |
| 6,212,290 B1 | 4/2001 | Gagne et al. | |
| 6,226,752 B1 | 5/2001 | Gupta et al. | |
| 6,257,487 B1 | 7/2001 | Hayashida | |
| 6,263,436 B1 | 7/2001 | Franklin et al. | |
| 6,270,011 B1 | 8/2001 | Gottfried | |
| 6,334,575 B1 | 1/2002 | Su-Hui | |
| 6,356,752 B1 | 3/2002 | Griffith | |
| 6,366,893 B2 | 4/2002 | Hannula et al. | |
| 6,377,692 B1 | 4/2002 | Takahashi et al. | |
| 6,378,073 B1 | 4/2002 | Davis | |
| 6,378,775 B2 | 4/2002 | Hayashida | |
| 6,405,314 B1 | 6/2002 | Bailey | |
| 6,435,406 B1 | 8/2002 | Pentel | |
| 6,470,448 B1 * | 10/2002 | Kuroda et al. | 713/176 |
| 6,512,919 B2 * | 1/2003 | Ogasawara | 455/422.1 |
| 6,529,885 B1 * | 3/2003 | Johnson | 705/64 |
| 6,587,684 B1 * | 7/2003 | Hsu et al. | 455/419 |
| 6,598,032 B1 | 7/2003 | Challener et al. | |
| 6,687,375 B1 | 2/2004 | Matyas et al. | |
| 6,715,679 B1 | 4/2004 | Infosino | |
| 6,766,453 B1 | 7/2004 | Nessett et al. | |
| 6,775,777 B2 | 8/2004 | Bailey | |
| 6,817,521 B1 | 11/2004 | Matada | |
| 6,874,029 B2 * | 3/2005 | Hutcheson et al. | 709/227 |
| 6,915,951 B2 * | 7/2005 | Hayashida | 235/379 |
| 6,926,200 B1 * | 8/2005 | Hayashida | 235/379 |
| 6,931,431 B2 | 8/2005 | Cachin et al. | |
| 6,957,334 B1 * | 10/2005 | Goldstein et al. | 713/170 |
| 6,985,583 B1 | 1/2006 | Brainard et al. | |
| 7,003,499 B2 | 2/2006 | Arditti et al. | |
| 7,025,256 B1 * | 4/2006 | Drummond et al. | 235/379 |
| 7,089,208 B1 * | 8/2006 | Levchin et al. | 705/39 |
| 7,099,471 B2 | 8/2006 | Neff | |
| 7,167,844 B1 | 1/2007 | Leong et al. | |
| 7,200,749 B2 | 4/2007 | Wheeler et al. | |
| 7,239,346 B1 | 7/2007 | Priddy | |
| 7,379,916 B1 * | 5/2008 | Mizrah | 705/44 |
| 7,427,033 B1 * | 9/2008 | Roskind | 235/492 |
| 7,578,436 B1 * | 8/2009 | Kiliccote | 235/380 |
| 2001/0004231 A1 | 6/2001 | Bailey | |
| 2001/0005840 A1 * | 6/2001 | Verkama | 705/67 |
| 2001/0010723 A1 | 8/2001 | Pinkas | |
| 2001/0034670 A1 * | 10/2001 | Blair | 705/27 |
| 2001/0037254 A1 | 11/2001 | Glikman | |
| 2001/0037264 A1 * | 11/2001 | Husemann et al. | 705/26 |
| 2001/0045458 A1 | 11/2001 | Polansky | |
| 2001/0053239 A1 | 12/2001 | Takhar | |
| 2002/0017561 A1 | 2/2002 | Tomoike | |
| 2002/0018585 A1 | 2/2002 | Kim | |
| 2002/0052841 A1 * | 5/2002 | Guthrie et al. | 705/40 |
| 2002/0057803 A1 * | 5/2002 | Loos et al. | 380/270 |
| 2002/0073024 A1 | 6/2002 | Gilchrist | |
| 2002/0077885 A1 | 6/2002 | Karro et al. | |
| 2002/0077974 A1 | 6/2002 | Ortiz | |
| 2002/0077993 A1 | 6/2002 | Immonen et al. | |
| 2002/0082925 A1 | 6/2002 | Herwig | |
| 2002/0087534 A1 | 7/2002 | Blackman et al. | |
| 2002/0087869 A1 | 7/2002 | Kim | |
| 2002/0095296 A1 | 7/2002 | Hind et al. | |
| 2002/0095570 A1 | 7/2002 | Eldridge et al. | |
| 2002/0097867 A1 * | 7/2002 | Bartram | 380/37 |
| 2002/0107007 A1 | 8/2002 | Gerson | |
| 2002/0107791 A1 | 8/2002 | Nobrega | |
| 2002/0141575 A1 | 10/2002 | Hird | |
| 2002/0163421 A1 | 11/2002 | Wang et al. | |
| 2002/0176579 A1 * | 11/2002 | Deshpande et al. | 380/270 |
| 2002/0196944 A1 | 12/2002 | Davis et al. | |
| 2003/0046541 A1 | 3/2003 | Gerdes et al. | |
| 2003/0061486 A1 | 3/2003 | Shibuya et al. | |
| 2003/0123667 A1 * | 7/2003 | Weber et al. | 380/277 |
| 2003/0174049 A1 * | 9/2003 | Beigel et al. | 340/10.42 |
| 2003/0190046 A1 | 10/2003 | Kamerman et al. | |
| 2003/0204726 A1 | 10/2003 | Kefford et al. | |
| 2003/0226030 A1 | 12/2003 | Hurst et al. | |
| 2004/0030894 A1 | 2/2004 | Labrou et al. | |
| 2004/0104268 A1 | 6/2004 | Bailey | |
| 2004/0123159 A1 * | 6/2004 | Kerstens et al. | 713/202 |
| 2004/0151323 A1 | 8/2004 | Olkin et al. | |
| 2004/0158492 A1 * | 8/2004 | Lopez et al. | 705/14 |
| 2004/0234117 A1 | 11/2004 | Tibor | |
| 2005/0067485 A1 * | 3/2005 | Caron | 235/380 |
| 2005/0122209 A1 | 6/2005 | Black | |
| 2005/0194452 A1 | 9/2005 | Nordentoft et al. | |
| 2006/0004862 A1 | 1/2006 | Fisher et al. | |
| 2006/0229988 A1 | 10/2006 | Oshima et al. | |
| 2006/0266823 A1 | 11/2006 | Passen et al. | |

FOREIGN PATENT DOCUMENTS

| | | |
|---|---|---|
| DE | 103 10 527 A1 | 9/2004 |
| EP | 0950968 | 2/1999 |
| EP | 0 982 674 A2 | 3/2000 |
| EP | 1 120 761 A2 | 8/2001 |
| EP | 1 178 444 A1 | 2/2002 |
| EP | 1 231 578 | 8/2002 |
| EP | 1 231 578 A2 | 8/2002 |
| EP | 1 237 132 A2 | 9/2002 |
| EP | 1 237 133 A2 | 9/2002 |
| EP | 1 237 134 A2 | 9/2002 |
| EP | 1 388 797 A2 | 2/2004 |
| GB | 2 386 236 | 9/2003 |
| JP | 2000-36000 | 2/2000 |

| | | |
|---|---|---|
| JP | 2000-207483 | 7/2000 |
| JP | 2000-269957 | 9/2000 |
| JP | 2001-147984 | 5/2001 |
| JP | 2001-331755 | 11/2001 |
| JP | 2002-215027 | 7/2002 |
| JP | 2002-259621 | 9/2002 |
| KR | 2000-0068758 | 11/2000 |
| WO | WO 97-41932 | 11/1997 |
| WO | WO 97/45814 | 12/1997 |
| WO | WO 97-45814 | 12/1997 |
| WO | WO 98/25371 | 6/1998 |
| WO | WO 98/37524 | 8/1998 |
| WO | WO 00/46959 | 8/2000 |
| WO | WO 01/01361 | 1/2001 |
| WO | WO 01-35570 * | 5/2001 |
| WO | WO 01/80133 | 10/2001 |
| WO | WO 01/98854 | 12/2001 |
| WO | WO 02/07117 | 1/2002 |
| WO | WO 02/11082 | 2/2002 |
| WO | WO 02/13151 | 2/2002 |
| WO | WO 02/27421 | 4/2002 |
| WO | WO 02/27439 | 4/2002 |
| WO | WO 02/29708 | 4/2002 |
| WO | WO 02/29739 | 4/2002 |
| WO | WO02/41271 | 5/2002 |
| WO | WO 02/43020 | 5/2002 |
| WO | WO 02/054655 | 7/2002 |
| WO | WO 02-59849 | 8/2002 |
| WO | WO 02/067534 | 8/2002 |

OTHER PUBLICATIONS

Purchase, 1996, Merriam-Webster's Dictionary of Law, http://dictionary.reference.com/browse/purchase, p. 4.*
Herschberg, Mark A., "Secure Electronic Voting Over the World Wide Web," Massachusetts Institute of Technology, May 27, 1997 (pp. 1-67).
Jan et al., "The Design of Protocol for e-Voting on the Internet." IEEE, Oct. 2001 (pp. 180-189).
Jan, Jinn-ke et al. "A secure anonymous voting protocol with a complete supervision." Computer Systems Science & Engineering, vol. 17, Nos. (4/5): Jul./Sep. 2002 (pp. 213-221).
Juang, Wen-Sheng et al. "A Verifiable Multi-Authorities Secret Election Allowing Abstaining from Voting." International Computer Symposium, Tainan, Taiwan, 1998 (pp. 1-21).
Menezes, Alfred J., et al., "Handbook of Applied Cryptography", 1997 CRC Press LLC, Section 1.5 Symmetric-key encryption (9 pages).
Summons to Attend Oral Proceedings; Annex to the Summons Preliminary Opinion of the Examining Division issued on Mar. 12, 2008 by the European Patent Office in the related European Patent Application No. 03254927.1-1238 (10 pages).
Menezes, Paul et al. "Handbook of Applied Cryptography" 5th Edition (Aug. 2001), Copyright 1996 CRC Press, Chapter 9.78 (pp. 321-383).
Steves, Douglas "Overview on Secure Transaction Protocols" http://www.usenix.org/publications/library/proceedins/ec96/full_papers/steves/html/node5.html#SECTION00021000000000000, May 4, 1997 (1 page article).
Deborah Bach, "CIBC Makes Long-Term Case for Wireless" [online], American Banker, vol. 167, No. 65, Apr. 5, 2002 (2 pages) [retrieved on Aug. 2, 2002]. Retrieved from the Internet: <URL: http://www.nerac.com>.
"Wawa Installs Wireless Card Processing" [online], CardLine, 2001 (1 page) [retrieved on Aug. 2, 2002]. Retrieved from the Internet: <URL: http://www.nerac.com>.
Jennifer A. Kingson, "First Data Sets Strategy for Wireless" [online], American Banker, vol. 167, No. 17, Jan. 25, 2002 (3 pages) [retrieved on Aug. 2, 2002]. Retrieved from the Internet: <URL: http://www.nerac.com>.
"Thirsty? Soon you may be able to charge and chug" [online], USA Today, Dec. 21, 2001, p. 7B (1 page) [retrieved on Aug. 2, 2002]. Retrieved from the Internet: <URL: http://www.nerac.com>.

M. Giometti, et al., "Creating Winning M-Commerce Models in the Financial Services" [online], FutureBanker, vol. 5, No. 10, Dec. 2001, p. 37 (2 pages) [retrieved on Aug. 2, 2002]. Retrieved from the Internet: <URL: http://www.nerac.com>.
"Hongkong Post Launches Mobile e-Certs" [online], Online Reporter, Oct. 22, 2001 (2 pages) [retrieved on Aug. 2, 2002]. Retrieved from the Internet: <URL: http://www.nerac.com>.
"Wallet and WIM pilot" [online], Mobile Europe, Oct. 2001, p. 16 (1 page) [retrieved on Aug. 2, 2002]. Retrieved from the Internet: <URL: http://www.nerac.com>.
"Regional News: Asia/Pacific: DoCoMo, Sony Use E-Purse, PDAs In Mobile Commerce Trial" [online]. Card Technology, vol. 2, No. 10, Oct. 2001 (1 page) [retrieved on Aug. 2, 2002]. Retrieved from the Internet: <URL: http://www.nerac.com>.
"Wildcard Sure Mobile Pizza Pilot Will Deliver" [online]. CardLine, Oct. 2001 (1 page) [retrieved on Aug. 2, 2002]. Retrieved from the Internet: <URL: http://www.nerac.com>.
Varshney, Upkar, et al., "Mobile commerce: Framework, applications and networking support" [online]. Mobile Networks Appl., vol. 7, No. 3, Jun. 2002, pp. 185-198 (1 page) [retrieved on Aug. 2, 2002]. Retrieved from the Internet: <URL: http://www.nerac.com>.
Friis-Hansen, et al., "Secure electronic transactions—The mobile phone evolution continues" [online]. Ericsson Rev. (Engl. Ed); vol. 78, No. 4, 2001, pp. 162-167 (1 page) [retrieved on Aug. 2, 2002]. Retrieved from the Internet: <URL: http://www.nerac.com>.
Bettstetter, Christian, et al., "(Auto) mobile communication in a heterogeneous and converged world" [online]. IEEE Pers Commun., vol. 8, No. 6, Dec. 2001, pp. 41-47 (1 page) [retrieved on Aug. 2, 2002]. Retrieved from the Internet: <URL: http://www.nerac.com>.
Gupta, S., "Securing the wireless internet" [online]. IEEE Commun. Mag., vol. 39, No. 12, Dec. 2001, pp. 68-75 (1 page) [retrieved on Aug. 2, 2002]. Retrieved from the Internet: <URL: http://www.nerac.com>.
Aalders, K., "Travel card: Airport self-check in using a wireless PDA" [online]. IEEE Conf. Intell Transport Syst Proc ITSC, 2001, pp. 1224-1228 (1 page) [retrieved on Aug. 2, 2002]. Retrieved from the Internet: <URL: http://www.nerac.com>.
Brananaghan, R.J., "Human factors issues in the design of handheld wireless devices" [online]. Proc SPIE Int Soc Opt Eng, vol. 4428, 2001, pp. 37-41 (1 page) [retrieved on Aug. 2, 2002]. Retrieved from the Internet: <URL: http://www.nerac.com>.
Cohn, Michael, Like money in your hand: Wireless technology lets financial firms quickly deliver transactions and trades. (Financial Services) [online]. Internet World, vol. 8, No. 5, May 1, 2002, pp. 54(3) (4 pages). [retrieved on Aug. 2, 2002]. Retrieved from the Internet: <URL: http://www.nerac.com>.
Ray Cammack Shows. (M&S News). (to use wireless credit card terminals) (Brief Article) [online]. Amusement Business, vol. 114, No. 17, Apr. 29, 2002, pp. 4(1) (1 page) [retrieved on Aug. 2, 2002]. Retrieved from the Internet: <URL: http://www.nerac.com>.
Kabaher, Apr., MasterCard snags citi exec for new wireless role. (Brief Article) [online]. Financial Net News, vol. 7, No. 14, Apr. 8, 2002, pp. 1(2) (1 page) [retrieved on Aug. 2, 2002]. Retrieved from the Internet: <URL: http://www.nerac.com>.
"Pepsi North America tests wireless vending in Memphis" [online]. Automatic Merchandiser, vol. 44, No. 2, Feb. 1, 2002, pp. 9(1) (1 page) [retrieved on Aug. 2, 2002]. Retrieved from the Internet: <URL: http://www.nerac.com>.
Radding, Alan, "Crossing the Wireless Security Gap." [online]. Computerworld, Jan. 1, 2001 (3 pages) [retrieved on Aug. 2, 2002]. Retrieved from the Internet: <URL: http://www.nerac.com>.
Commerciant inks wireless deal. (EDS will provide transaction processing services for Commerciant's wireless terminals) (Brief Article) [online]. Houston Business Journal, vol. 32, No. 23, Oct. 19, 2001 (1 page) [retrieved on Aug. 2, 2002]. Retrieved from the Internet: <URL: http://www.nerac.com>.
"Wireless in Boston (Fleet HomeLink offers services through personal digital assistants) (Brief Article)" [online]. Bank Marketing, vol. 33, No. 7, Sep. 1, 2001 (1 page) [retrieved on Aug. 2, 2002]. Retrieved from the Internet: <URL: http://www.nerac.com>.
Murphy, Patricia A., Wireless payment technology spreads from gas pump to store. (VeriFone system) [online]. Stores, vol. 83, No. 5, May 1, 2001, pp. 74(2) (1 page) [retrieved on Aug. 2, 2002]. Retrieved from the Internet: <URL: http://www.nerac.com>.

Hoffman, Karen Epper, New Options in Wireless Payments. (Company Business and Marketing) [online]. InternetWorld, vol. 7, No. 7, Apr. 1, 2001, pp. 37 (4 pages) [retrieved on Aug. 2, 2002]. Retrieved from the Internet: <URL: http://www.nerac.com>.

Khachtchanski, V.I., et al., "Universal SIM toolkit-based client for mobile authorization system" [online]. Third International Conference on Information Integration and Web-based Applications and Services, 2001, pp. 337-344 (1 page) [retrieved on Aug. 2, 2002]. Retrieved from the Internet: <URL: http://www.nerac.com>.

"CIBC kicks off wireless banking service" [online]. Bank Systems + Technology, vol. 39, No. 5, May 2002, p. 12 (1 page) [retrieved on Aug. 2, 2002]. Retrieved from the Internet: <URL: http://www.nerac.com>.

Asthana, Abhaya, et al., An Indoor Wireless System for Personalized Shopping Assistance (1994) [online]. IEEE Workshop on Mobile Computing Systems and Applications (1 page) [retrieved on Aug. 2, 2002]. Retrieved from the Internet: <URL: http://www.nerac.com>.

Electronic payment systems, involving mobile phones (list of e-products, 15 listings), [online] Electronic Payment System Observatory (the ePSO website aims to monitor the progress of retail payment innovation throughout Europe, ePSO inventory of E-Payment services—List of e-products) (26 pages). European Central Bank, Frankfurt, Germany, 2002 [retrieved Sep. 11, 2002]. Retrieved from the Internet: <http://epso.intrasoft.lu>,.

Yannis Labrou, et al., "Wireless Wallet", Proceedings of the First Annual International Conference on Mobile and Ubiquitous Systems: Networking and Services (MobiQuitous '04); ISBN: 0-7695-2208-4, IEEE, Aug. 22, 2004.

Mobile, Academic Press Dictionary of Science and Technology, xreferplus (1992); <URL: http://xreferplus.com/entry.jsp?xrefid=3130947&secid=.&hh=1>, 1 page.

Purchase, 1996, Merriam-Webster's Dictionary of Law, <URL: http://dictionary.reference.com/browse/purchase>, page 4.

U.S. Appl. No. 60/401,807, filed Aug. 8, 2002, Yannis Labrou, et al.
U.S. Appl. No. 10/458,205, filed Jun. 11, 2003, Yannis Labrou, et al.
U.S. Appl. No. 10/628,584, filed Jul. 29, 2003, Yannis Labrou, et al.
U.S. Appl. No. 10/628,569, filed Jul. 29, 2003, Yannis Labrou, et al.
U.S. Appl. No. 10/628,583, filed Jul. 29, 2003, Yannis Labrou, et al.
U.S. Appl. No. 60/544,300, filed Feb. 17, 2004, Yannis Labrou, et al.
U.S. Appl. No. 60/669,375, filed Apr. 8, 2005, Yannis Labrou, et al.
U.S. Appl. No. 11/045,484, filed Jan. 31, 2005, Yannis Labrou, et al.
U.S. Appl. No. 60/703,862, filed Aug. 1, 2005, Yannis Labrou, et al.
U.S. Appl. No. 11/041,223, filed Jan. 25, 2005, Yannis Labrou, et al.
U.S. Appl. No. 11/388,202, filed Mar. 24, 2006, Yannis Labrou, et al.
U.S. Appl. No. 60/541,903, filed Feb. 6, 2004, Yannis Labrou, et al.
U.S. Appl. No. 60/549,148, filed Mar. 3, 2004, Yannis Labrou, et al.
U.S. Appl. No. 60/575,835, filed Jun. 2, 2004, Yannis Labrou, et al.

PCT International Search Report dated Oct. 4, 2005 for International Application No. PCT/US05/04049 related to the above-identified present pending US patent application (2 pages).

Form PCT/ISA/237—Written Opinion of the International Searching Authority dated Oct. 4, 2005 in International Application No. PCT/US05/04049 related to the above-identified present pending US patent application (3 pages).

International Preliminary Report on Patentability (Chapter I of the Patent Cooperation Treaty) dated Aug. 22, 2006 in International Application No. PCT/US05/04049 related to the above-identified present pending US patent application (5 pages).

European Communication Pursuant to Article 96(2) EPC dated Jul. 26, 2005 in European Application No. 03 254 927.1-1238, related to the above-identified present pending US patent application (6 pages).

European Search Report Communication issued by the European Patent Office on Aug. 30, 2004 in European Application No. 03254927.1-1238 related to the above-identified present pending US patent application (3 pages).

European Search Report Communication issued by the European Patent Office on Jan. 8, 2007 in Application No. 06253923.4-1238 related to the above-identified present pending US patent application (13 pages).

Nerac (Patents, Intellectual Property, Research), [online]. Nerac, Inc. Tolland CT, USA, 4 pages [retrieved Dec. 18, 2006]. Retrieved from the Internet: <URL: http://www.nerac.com>.

MeT Mobile electronic Transactions (MeT limited is a company founded to establish a framework for secure mobile transactions) [online]. Mobile electronic Transactions Limited, 2003, 3 pages [retrieved Jan. 5, 2005]. Retrieved from the Internet: <URL: http://www.mobiletransaction.org>.

Two-Factor Token Matrix [online]. Diversinet Corp., 2 pages [retrieved on Mar. 24, 2006]. Retrieved from the Internet: <URL: http://www.diversinet.com/>.

Diversinet Delivers Consumer-Ready Soft Token Strong Authentication Solution [online]. Diversinet Corp., Feb. 7, 2006, 2 pages [retrieved on Dec. 27, 2006]. Retrieved from the Internet: <URL: http://www.diversinet.com/html/press/2006/consumer.html>.

Labrou, Yannis, 'Re: Mobile payments with a downloadable application from PayWi (referencing "PayWi Powers Personal Payments in Your Palm," PRNewswire, Portland Oregon, Feb. 6, 2006) [online]. Feb. 21, 2006 (4 pages) [retrieved Mar. 24, 2006]. Retrieved from the Internet: <URL: http://uptf.blogspot.com/2006/02/mobile-payments-with-downloadable.html>.

Labrou, Yannis. UPTF blog (a blog for Wireless Wallet) [online] 22 pages [retrieved Dec. 27, 2006] Retrieved from the Internet: <URL: http://uptf.blogspot.com>.

Electronic Payment System Observatory (the ePSO website aims to monitor the progress of retail payment innovation throughout Europe, ePSO inventory of E-Payment services—List of e-products) [online]. European Central Bank, Frankfurt, Germany (3 pages) [retrieved Dec. 18, 2006]. Retrieved from the Internet: <URL: http://epso.intrasoft.lu>.

"Via Licensing Begins Process to Form Wireless Networking Patent Licensing Pool" [online]. Via Licensing Corporation, Oct. 23, 2003, 3 pages [retrieved Nov. 17, 2003]. Retrieved from the Internet: <URL: http://www.vialicensing.com/news/details.cfm?VIANEWS_ID=308>.

Labrou, Yannis, 'Re: Motorola's M-Wallet: Mobile payments with a J2ME application' (referencing "Motorola M-Wallet Solution" brochure Motorola, Inc. 2006) in UPTF blog for Wireless Wallet [online], Feb. 21, 2006, 5 pages [retrieved Mar. 24, 2006]. Retrieved from the Internet: <URL: http://uptf.blogspot.com/2006/02/mobile-payment-withdownloadable.html>.

IEEE Standards Association (IEEE Std 802.11 and amendments) (802.11 patent information) [online]. IEEE-SA, 19 pages [retrieved Dec. 27, 2006]. Retrieved from the Internet: <URL: http://standards.ieee.org/db/patents/pat802_11.html>.

European Search Report Communication issued by the European Patent Office on Apr. 23, 2007 in Application No. 06251957.4-1244 related to the above-identified present pending US patent application (9 pages).

European Search Report Communication issued by the European Patent Office on Nov. 15, 2007 in the related European Patent Application No. 03254926.3-1244 (3 pages).

Korean Office Action issued by the Korean Intellectual Property Office on Nov. 8, 2007 in related Korean Patent Application No. 10-2006-7019071 based upon PCT/US2005/004049 (4 pages) (English translation consisting of 4 pages).

European Communication Pursuant to Article 94(3) EPC dated May 19, 2009 in European Application No. 03 254 926.3-2413, related to the above-identified present pending US patent application (7 pages).

Steves, Douglas "Overview on Secure Transaction Protocols" <URL: http://www.usenix.org/publications/library/proceedins/ec96/full_papers/>, steves/html/node5.html#SECTION00021000000000000, May 4, 1997 (1 page article).

European Decision to refuse Patent Application dated Apr. 28, 2009 in corresponding European Application No. 03 254 927.1-238, of the above-identified present pending US patent application (14 pp).

US Office Action mailed Oct. 14, 2009 in copending related application No. 11/041,223.

US Office Action mailed Oct. 21, 2009 in copending related application No. 11/488,178.

U.S. Office Action mailed Jan. 9, 2008 in co-pending related U.S. Appl. No. 10/628;584 (12 pages).

U.S. Office Action mailed Feb. 12, 2008 in co-pending related U.S. Appl. No. 10/628,584 (7 pages).
U.S. Office Action mailed Sep. 27, 2006 in co-pending related U.S. Appl. No. 10/628, 584 (17 pages).
U.S. Office Action mailed Apr. 19, 2007 in co-pending related U.S. Appl. No. 10/628,584 (41 pages).
U.S. Office Action (Notice of Allowance) mailed Oct. 1, 2007 in co-pending related U.S. Appl. No. 10/628,584 (14 pages).
U.S. Office Action mailed May 3, 2007 in co-pending related U.S. Appl. No. 10/628,569 (10 pages).
U.S. Office Action mailed Oct. 14, 2008 in co-pending related U.S. Appl. No. 10/628,569 (2 pages).
U.S. Office Action mailed Oct. 19, 2007 in co-pending related U.S. Appl. No. 10/628,569 (12 pages).
U.S. Office Action mailed Jun. 26, 2008 in co-pending related U.S. Appl. No. 10/628,569 (19 pages).
U.S. Office Action mailed Apr. 2, 2009 in co-pending related U.S. Appl. No. 10/628,569 (18 pages).
U.S. Office Action mailed Aug. 31, 2009 in co-pending related U.S. Appl. No. 10/628,583 (16 pages).
U.S. Office Action mailed Nov. 24, 2009 in co-pending related U.S. Appl. No. 10/628,569 (26 pages).
U.S. Office Action (Advisory Action) mailed Feb. 28, 2008 in co-pending related U.S. Appl. No. 10/628,569 (2 pages).
U.S. Office Action mailed May 22, 2007 in co-pending related U.S. Appl. No. 10/458,205 (31 pages).
U.S. Office Action mailed Jan. 5, 2007 in co-pending related U.S. Appl. No. 10/458,205 (13 pages).
U.S. Office Action mailed Oct. 29, 2007 in co-pending related U.S. Appl. No. 10/458,205 (9 pages).
U.S. Office Action mailed Mar. 16, 2009 in co-pending related U.S. Appl. No. 10/628,583 (8 pages).
U.S. Office Action mailed Jul. 2, 2008 in co-pending related U.S. Appl. No. 10/628,583 (22 pages).
U.S. Office Action mailed Dec. 27, 2007 in co-pending related application 10/628,583 (49 pages).
U.S. Office Action mailed Mar. 8, 2007 in co-pending related U.S. Appl. No. 10/628,583 (29 pages).
U.S. Office Action mailed Oct. 14, 2009 in co-pending related U.S. Appl. No. 11/0412,23 (22 pages).
U.S. Office Action mailed Apr. 17, 2008 in co-pending related U.S. Appl. No. 10/628,583 (8 pages).
U.S. Office Action mailed Jul. 2, 2008 in co-pending related U.S. Appl. No. 10/628,583 (17 pages).
U.S. Office Action mailed Apr. 2, 2009 in co-pending related U.S. Appl. No. 11/041,223 (20 pages).
U.S. Office Action mailed Mar. 5, 2008 in co-pending related U.S. Appl. No. 11/041,223 (14 pages).
U.S. Office Action mailed Oct. 17, 2008 in co-pending related U.S. Appl. No. 11/041,223 (21 pages).
U.S. Office Action mailed Jun. 25, 2008 in co-pending related U.S. Appl. No. 11/045,484 (21 pages).
U.S. Office Action mailed Nov. 21, 2008 in co-pending related U.S. Appl. No. 11/045,484 (24 pages).
U.S. Office Action mailed Apr. 13, 2009 in co-pending related U.S. Appl. No. 11/045,484 (28 pages).
U.S. Office Action mailed Nov. 24, 2009 in co-pending related U.S. Appl. No. 11/045,484 (51 pages).
U.S. Office Action mailed Oct. 1, 2008 in co-pending related U.S. Appl. No. 11/388,202 (25 pages).
U.S. Office Action (Supplemental Action Notice of Allowability) mailed Jun. 18, 2009 in co-pending related application 11/388,202 (3pages).
U.S. Office Action (Notice of Allowance) mailed Jun. 1, 2009 in co-pending related U.S. Appl. No. 11/388,202 (32 pages).
U.S. Office Action (Supplemental Action Notice of Allowability) mailed Sep. 18, 2009 in co-pending related U.S. Appl. No. 11/388,202 (15 pages).
U.S. Office Action mailed Jul. 16, 2008 in co-pending related U.S. Appl. No. 11/388,202 (6 pages).
First Notification of Office action issued by the State Intellectual Property Office of China on Nov. 13, 2009 in related Chinese Patent Application No. 200610109167.7 (5 pages) English Translation (7 pages).
Japanese Office Action mailed on Oct. 20, 2009 in related Japanese Patent Application No. 2006-554126 (4 pages); English Translation (8 pages).
European Office Action mailed on Nov. 19, 2009 in related European Patent Application No. 06251957.4-1244.
Japanese Office Action Mailed Jul. 14, 2009 issued in related Japanese Application No. 2006-554126 (6 pages) (translation 5 pages).
Japanese Office Action Mailed Jan. 19, 2010 in related Japanese Application No. 2003-289408 (4 pages).
U.S. Office Action mailed Mar. 31, 2010 in related co-pending U.S. Appl. No. 11/041,223.
Notice of Allowance mailed May 19, 2010 in related co-pending U.S. Appl. No. 10/628,583.

* cited by examiner

LEGEND FOR VARIATIONS 5-8 — 1200

- "1,2" MEANS 1 FOLLOWED BY 2
- "1 OR 2 OR 3" MEANS THAT ONE OF 1,2,3 (AND ONLY ONE CAN TAKE PLACE)
- "(1 OR 2) OR 3" MEANS EITHER ONE OF 1 OR 2 TAKES PLACE, OR 3 TAKES PLACE
- 1 (OPT) MEANS THAT 1 IS OPTIONAL
- ACTIONS DENOTED ALONGSIDE ARROWS DENOTE TRANSMISSIONS

210 — — — ▶ COMMUNICATED VISUALLY OR AUDIBLY OR RF

211 ·······▶ COMMUNICATED WIRELESSLY (MIGHT NOT BE A SECURE NETWORK)

220 ——▶ COMMUNICATED OVER DATA NETWORK (MIGHT BE WIRED OR WIRELESS AND PREFERABLY SECURE)

FIG. 12

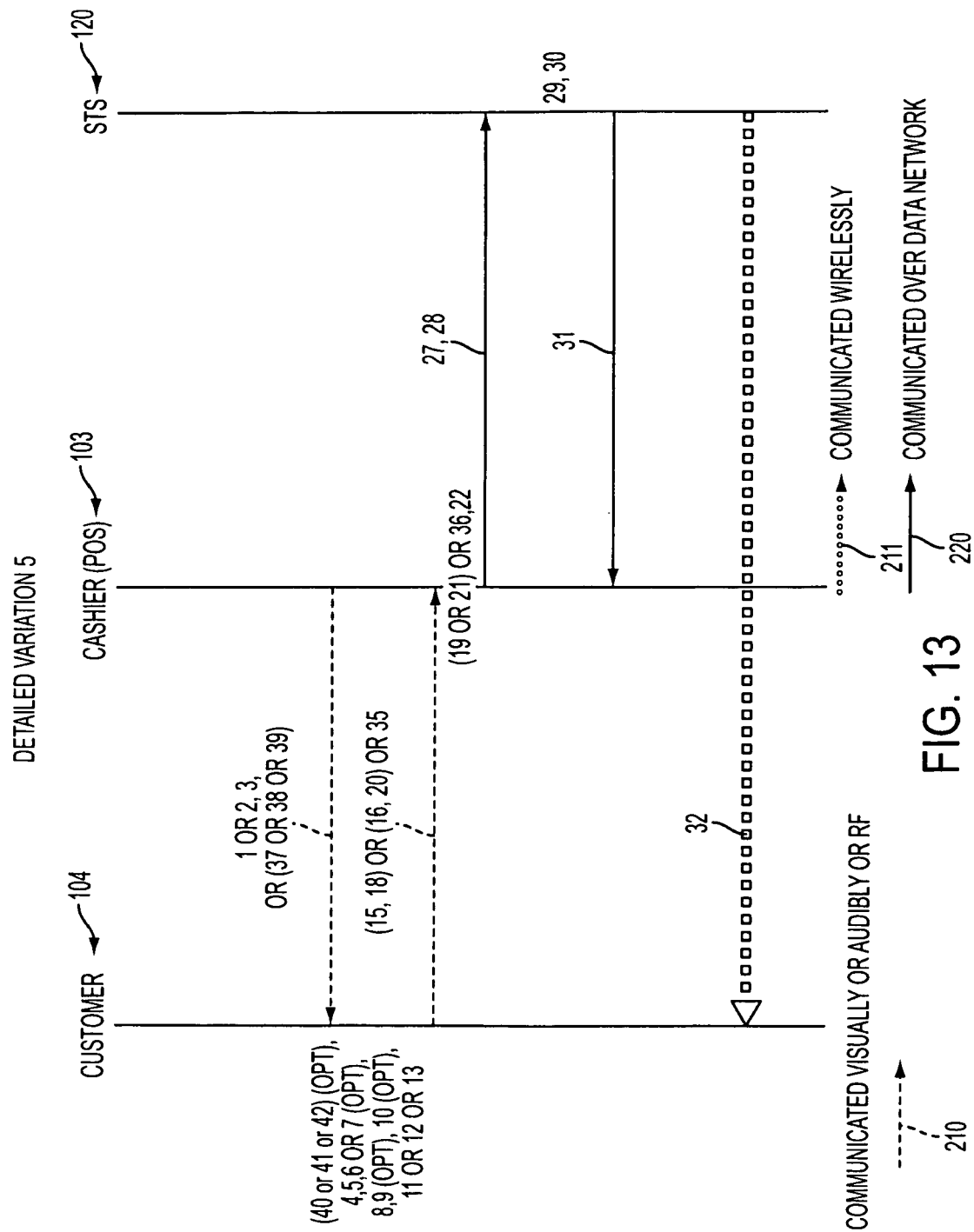

WIRELESS COMPUTER WALLET FOR PHYSICAL POINT OF SALE (POS) TRANSACTIONS

CROSS-REFERENCE TO RELATED APPLICATIONS

This application claims the benefit of priority under 35 USC 119(e) to U.S. Provisional Application Ser. No. 60/703,862, entitled WIRELESS WALLET FOR PHYSICAL POINT OF SALE (POS) TRANSACTIONS, by Yannis Labrou and Jonathan Agre, filed Aug. 1, 2005 in the U.S. Patent and Trademark Office, the contents of which is incorporated herein by reference.

This application is a continuation-in-part of U.S. patent application Ser. No. 11/388,202, filed Mar. 24, 2006 now U.S. Pat. No. 7,606,560, entitled "Authentication Services Using Mobile Device," which claims priority to U.S. Provisional Application Ser. No. 60/669,375 filed Apr. 8, 2005; and also a continuation-in-part of U.S. patent application Ser. No. 11/045,484, filed Jan. 31, 2005, entitled "WIRELESS WALLET" which claim priority to U.S. Provisional Application Ser. No. 60/544,300 filed Feb. 17, 2004; and also a continuation-in-part of U.S. application Ser. No. 10/458,205, filed Jun. 11, 2003 now U.S. Pat. No. 7,353,382, which claims the benefit of U.S. provisional application No. 60/401,807, filed Aug. 8, 2002; and also a continuation-in-part of U.S. application Ser. No. 10/628,584 filed Jul. 29, 2003, which claims the benefit of U.S. provisional application No. 60/401,807 filed Aug. 8, 2002; and also a continuation-in-part of U.S. application Ser. No. 10/628,569 filed Jul. 29, 2003 now U.S. Pat. No. 7,349,871, which claims the benefit of U.S. provisional application No. 60/401,807 filed Aug. 8, 2002; and also a continuation-in-part of U.S. application Ser. No. 10/628,583 filed Jul. 29, 2003, which claims the benefit of U.S. provisional application No. 60/401,807 filed Aug. 8, 2002.

This application is also related to pending U.S. patent application Ser. No. 11/388,202, filed Mar. 24, 2006, entitled AUTHENTICATION SERVICES USING MOBILE DEVICE, the entire disclosure of which is hereby incorporated herein by reference and attached hereto. This application is also related to pending U.S. patent application Ser. No. 11/045,484, filed Jan. 31, 2005, entitled WIRELESS WALLET, the entire disclosure of which is hereby incorporated herein by reference and attached hereto.

This application is also related to pending U.S. patent application Ser. No. 10/458,205, filed Jun. 11, 2003; Ser. No. 10/628,584, filed Jul. 29, 2003; Ser. No. 10/628,569, filed Jul. 29, 2003; and Ser. No. 10/628,583, filed Jul. 29, 2003, the entire disclosures of all of which are hereby incorporated herein by reference.

BACKGROUND OF THE INVENTION

1. Field of the Invention

The present invention relates to a wireless computing apparatus/device for physical Point of Sale (POS) transactions.

2. Description of the Related Art

There is a need to improve payment speed at a physical POS. There is also a need to improve the cost of a transaction with the physical POS using a wireless communication computing apparatus. There is also a need to reduce the size of messages for communication efficiency in short-range communication methods.

SUMMARY OF THE INVENTION

The present invention provides a wireless communication computing apparatus/device for physical Point of Sale (POS) transactions. For example, a mobile phone and/or a personal digital assistant (PDA) wireless communication wallet for physical POS transactions.

The above as well as additional aspects and advantages will be set forth in part in the description which follows and, in part, will be obvious from the description, or may be learned by practice of the described embodiments.

Methods and systems providing a secure transaction server (STS); providing an authentic point of sale (POS) device, according to a first authentication parameter of the STS; providing an authentic mobile purchasing device, according to a second authentication parameter of the STS; providing a short-range communication method between the POS device and the mobile purchasing device; correlating by the STS a personal identification entry (PIE) and the authentic mobile purchasing device; transmitting, by the POS device, a time dependent transformed secure POS authenticable POS purchase action to the STS; inputting the PIE to the mobile purchasing device to transmit a time dependent transformed secure user authenticable POS purchase action to the POS device via the short-range communication method; and approving, by the STS, the POS purchase action for the POS device and for the mobile purchasing device, according to the authentic POS device, and according to the authentic mobile purchasing device and the STS correlating of the PIE and the authentic mobile purchasing device.

According to an aspect of the embodiments, the POS purchase action identifies payment for a good and/or a service.

BRIEF DESCRIPTION OF THE DRAWINGS

The above-described aspects and advantages together with other aspects and advantages will become apparent and more readily appreciated from the following description of the embodiments, taken in conjunction with the accompanying drawings of which:

FIGS. 5-16 are flowcharts of mobile device to POS authenticable transactions, according to the embodiments of the present invention.

DETAILED DESCRIPTION OF THE PREFERRED EMBODIMENTS

Figure 1:
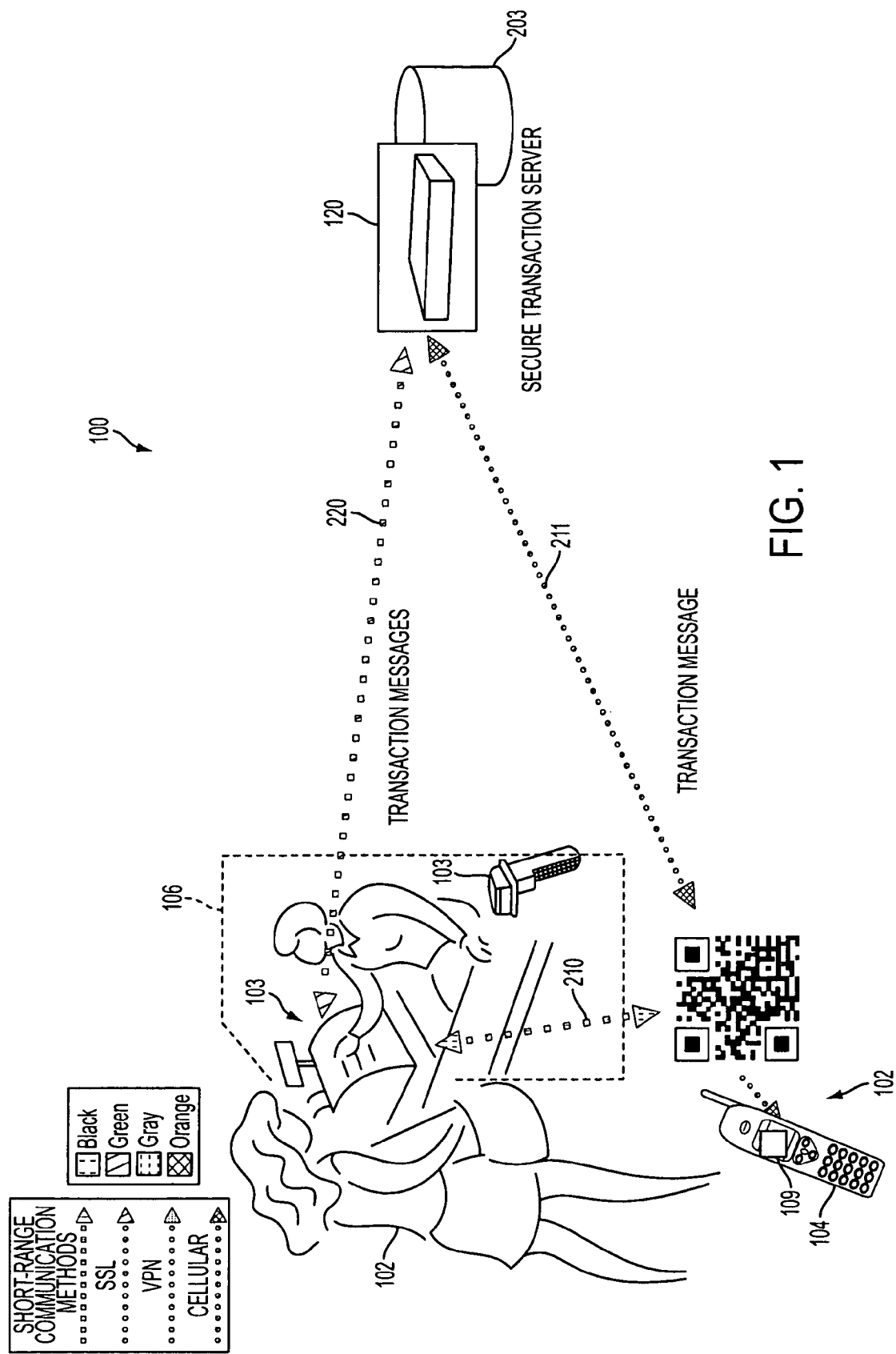
FIG. 1 is a diagram of a computer system 100 to provide a mobile wireless communication apparatus to a physical point of sale (POS) transaction service, according to an embodiment of the present invention.

Reference will now be made in detail to the present embodiments of the present invention, examples of which are illustrated in the accompanying drawings, wherein like reference numerals refer to the like elements throughout. The embodiments are described below to explain the present invention by referring to the figures.

The described embodiments provide a wireless communication computing apparatus/device for physical Point of Sale (POS) transactions. For example, a mobile phone and/or a personal digital assistant (PDA) wireless communication wallet for physical POS transactions. The discussed methods and apparatuses and variations improve on the speed of a payment at a physical POS, the cost of the transactions since they do not always require that the mobile phone connect to the wireless Internet or cellular telephone network for the transaction to be authenticated and approved. In addition, the size of the messages is reduced for short-range communication methods.

FIG. 1 is a diagram of a computer system 100 to provide a mobile wireless communication apparatus to a physical point of sale (POS) transaction service, according to an embodiment of the present invention. According to the embodiments, a user 102 uses a mobile device 104, such as (without limitation) a mobile phone or a PDA, with wireless communication capability, to transact with a Point of Sale (POS) device 103, such as (without limitation) a cash register, of a provider 106, for example, to purchase an item or receive a service, etc. According to an aspect of the embodiments, the POS 103 can be another mobile device 104, such as another mobile phone. According to an aspect of the embodiments, a provider 106 operates one or a plurality of POSs 103. According to an aspect of the embodiment, the provider 106 and the POS 103 can be collapsed together. The mobile device 104 can be any mobile wireless communication computing device or mobile radio computing device, including, without limitation, a mobile phone, that wirelessly communicates (e.g., wireless Internet or mobile phone network 211) with other mobile devices 104a-n, with a secure transaction server 120, or with a POS 103, or any combinations thereof. According to an aspect of the embodiments, the mobile device 104 has one or more short-range communication methods 210 implemented therein, for example (without limitation), image, audio, and/or RF, to communicate with the POS 103.

According to an aspect of the embodiments, the invention improves using a mobile device 104, such as a mobile phone 104, for physical POS transactions, within the context of the Universal Pervasive Transactions Framework (UPTF). One main concept behind the discussed methods and variations is that the consumer's or customer's mobile phone 104 communicates to the Point of Sale (POS) 103 a transaction message, for example, a UPTF SAS based transaction message, used to authenticate and approve the transaction via:

(1) An image,
(2) An audio signal,
(3) Any short-range wireless connectivity technology, such as (without limitation) a short range RF signal, such as WiFi, Bluetooth, Radio Frequency Identification (RFID), or smart card, Near Field Communication (NFC) signal, or any combinations thereof, or
(4) Any combinations thereof.

According to an aspect of the embodiments, the POS 103 has equipment that can send, receive, and interpret a locally transmitted/received message to re-construct a corresponding UPTF SAS message for UPTF transaction verification protocol. For example, an image interpreter at the POS 103 can decode a UPTF SAS message from an image displayed on the mobile phone's 104 display. Another example is to use an audio processor at the POS 103 that can decode a UPTF SAS message from an audio signal "played" through the mobile phone's 104 speaker to the POS 103 microphone. Another example is an RF signal between the POS 103 and mobile phone 104. The information received by the POS 103 is used to create one or more of the UPTF SAS messages (i.e., POS transaction view or the provider/merchant/payee transaction view) needed for the UPTF transaction verification protocol, which the mobile device 104 and/or the POS 103 (as the case may be) transceive with the STS 120. According to an aspect of the embodiments, the POS 103 transmits to the Secure Transaction Server (STS) 120 the mobile phone 104 provided RF based UPTF SAS message, or an image, audio after converting the same to a corresponding UPTF SAS message; the result of this conversion being a UPTF SAS based digital message. According to an aspect of the embodiments, the POS also transceives, by passing through any user related UPTF SAS messages (e.g., user transaction view generated at the mobile phone 104), such as an image or audio, without any prior conversion of the same to/from the STS 120. The POS 103 can be connected to the STS 120 possibly through a data network that can be a wireless connection and/or a wired connection.

In the case of an image, the POS 103 equipment can be a barcode scanner, preferably one that is capable of processing 2-Dimensional barcodes. In the case of an audio signal, the POS equipment 103 is an acoustic coupler or a DTMF (Dual Tone Multi-Frequency) tone recognizer. A DTMF recognizer (detector) is usable to recognize touchtone entries into over-the-phone customer service systems.

Another method discussed improves on physical POS 103 purchasing by using Short Message Service (SMS) and/or Multimedia Message Service (MMS) messages to transmit UPTF SAS messages among the mobile phone 104, POS 103 and/or the STS 120. More generally, SMS messages can be used as the transported mechanism for all types of UPTF transactions (see co-pending UPTF-related patent applications incorporated herein by reference.

The invention can be implemented in any mobile device 104 capable of executing UPTF SAS based Wireless Wallet software 108, in a POS 103 (a computing apparatus) capable of executing the UPTF SAS protocol and POS functions, and a UPTF-SAS based Secure Transaction Server (STS) 120. Companies interested in allowing their users to securely perform transactions from a mobile device 104 can adopt the UPTF SAS protocol.

Therefore, embodiment(s) described herein relate to a mobile device authenticable transaction with the POS 103. According to an aspect of the embodiments, an authenticated or authenticable transaction is based upon Universal Pervasive Transaction Framework Secure Agreement Submission (UPTF SAS) protocol. Universal Pervasive Transaction Framework (UPTF) is a framework for authenticating transactions initiated by a mobile (radio) device. The UPTF SAS protocol is discussed in related pending U.S. patent application Ser. No. 11/388,202, filed Mar. 24, 2006; Ser. No. 11/045,484, filed Jan. 31, 2005; Ser. No. 10/458,205, filed Jun. 11, 2003; Ser. No. 10/628,584, filed Jul. 29, 2003; Ser. No. 10/628,569, filed Jul. 29, 2003; and Ser. No. 10/628,583, filed Jul. 29, 2003, the entire disclosures of all of which are hereby incorporated herein by reference. According to an aspect of the embodiments, a mobile device 104 provides authenticated transaction services according to authenticable transaction view(s) of one or more parties (i.e., in a typical embodiment paired and/or more than two authenticated transaction views), wherein the authenticated transaction views are time, user and software dependent, secured (e.g., encrypted), matched (verified against each other), and transaction party anonymous to the POS 103 (e.g., a transacting party does not have to receive personal/private/confidential information (e.g., account information) of the other transacting party. Therefore, according to the embodiments authentication includes transaction or agreement of parties verification.

Figure 2:
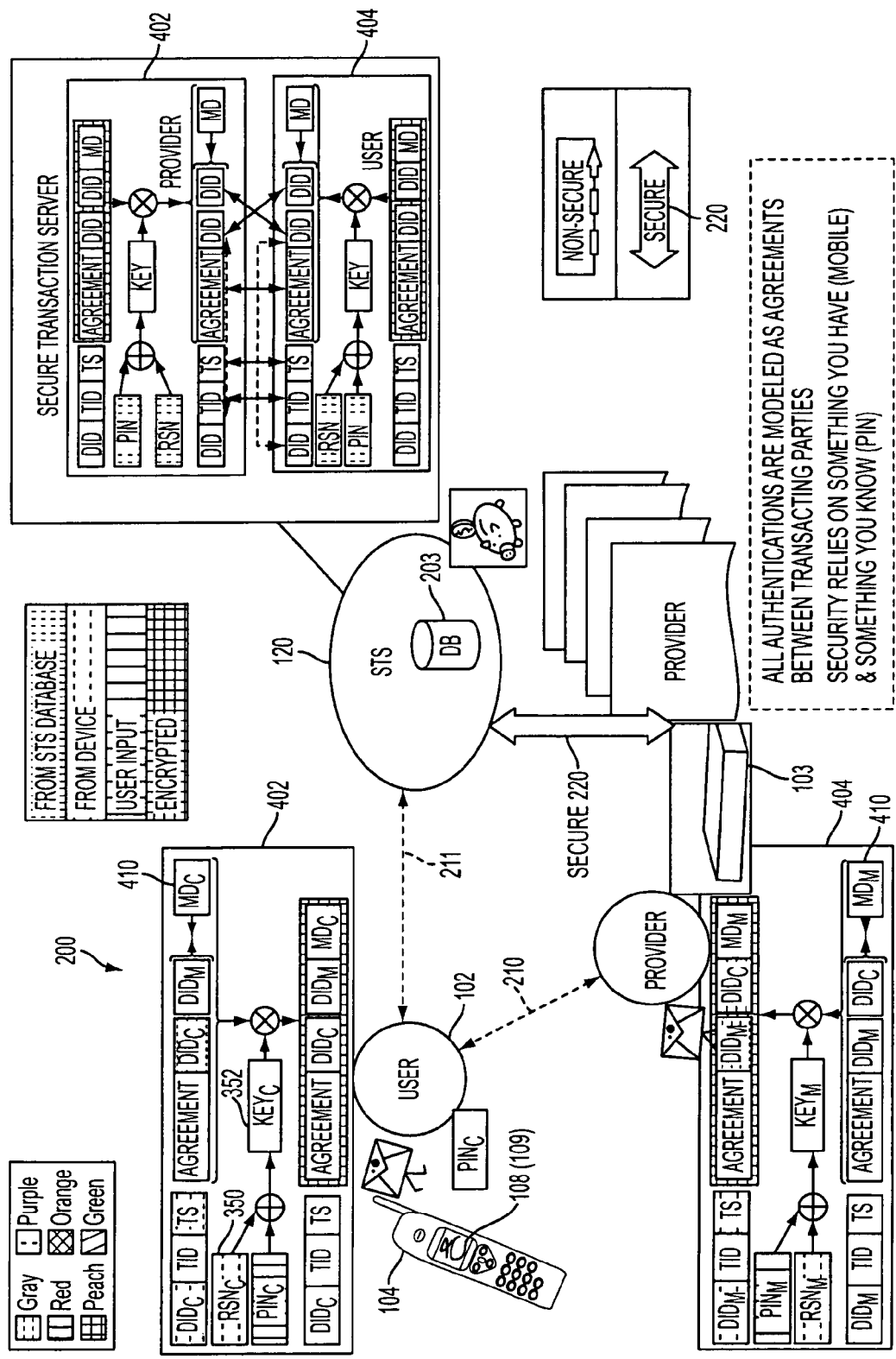
FIG. 2 is a functional block diagram of Universal Pervasive Transaction Framework Secure Agreement Submission (UPTF SAS) system architecture to execute a mobile device POS authenticable transaction, according to an embodiment of the present invention.

FIG. 2 is a functional block diagram of Universal Pervasive Transaction Framework Secure Agreement Submission (UPTF SAS) system 200 architecture to execute an authenticable transaction using a mobile device and a POS, according to an embodiment of the present invention. In FIG. 2 and other figures, color designations are used to highlight features/concepts described, for example, a type of, or a possible type of, communication channel. For example, communication channels may be Virtual Private Network (VPN), mobile phone or cellular network, or unknown by referring to any known type of computer data communication network. The Universal Pervasive Transaction Framework (UPTF) defines a system architecture based upon independent and anonymous transaction agreement views and a communication security protocol called the Secure Agreement Submission (SAS) protocol to transmit the views. Essentially the UPTF offers a vessel, which is able to securely carry the individual views of a transaction agreement, in this case a mobile device POS authenticable transaction (collectively referred to as a mobile device POS transaction), from each party involved in the transaction to a trusted third party for verification, using a communication network which may comprise insecure segments, such as wireless Internet, mobile telephone network or cellular links, short-range communication methods. According to an aspect of the embodiments, a UPTF SAS message is an authorization for a specific transaction at this time. When a mobile POS 104 is used for a POS transaction, the transaction parties are the user 102 and the provider 106 that operates the POS 103 with which the user 102 desires to conduct a transaction. A typical example of a "mobile device POS transaction" agreement view may comprise: "User A, Transaction Token."

In FIG. 2, the UPTF SAS protocol encrypts/decrypts a transaction message using a symmetric, secret-key $352_{c,m}$ approach where the secret key $352_{c,m}$ is producible only by an individual party's mobile device 104 and a trusted third party (e.g., implemented as STS 120) and without transmission of the secret key among the parties. In other words, the UPTF SAS provides an implicit user authentication, because decryption by a trusted third party, such as STS 120, of a sending party's encrypted message, authenticates the sending party. The SAS insures that the authenticity of the parties is verified and during delivery, the privacy of the information is preserved (transaction party anonymity), even when the parties distrust each other and the messages from one party may be forwarded by the other to the third party verification (as the case may be). The UPTF provides the mechanism for the trusted third party 120 to verify that the independent views of the mobile device POS transaction are consistent with each other.

In FIG. 2, after the STS 120 extracts the mobile device POS transaction data from the transaction views received from the parties and the STS 120 verifies the received mobile device POS transaction data, further actions may be needed, which, for example, may be realized by the trusted third party 120 interacting with financial institutions associated with the user payer 102 and the provider (merchant) payee 106 to cause the transfer of the specified funds between the user payer 102 and the provider payee 106.

In FIG. 2, a UPTF based mobile device POS authenticable transaction system architecture comprises a user 102 operating a UPTF device (also referred to as Universal Pervasive Transaction Device—UPTD), such as a mobile phone 104 loaded with a mobile point of sale (POS) application 109 (hereinafter referred to as mobile POS application that can be implemented in software and/or computing hardware), a provider 106 operating another UPTF based device 205, a Secure Transaction Server (STS) 120, and optionally for additional transactions a number of financial institutions (not shown), and several non-secure and secure (as the case may be) communication channels among them. Typically according to an embodiment, the separation of the STS 120 and the provider 106 as shown in FIG. 2 is a logical separation, as a single entity or separate entities (as the case may be) can implement each.

In FIG. 2, according to an aspect of the embodiment described herein, the STS 120 authenticates a mobile device 104 by an authentication parameter(s) 350 to provide an authenticable mobile POS 104. The authentication parameter (s) of the STS is secret information used for encrypting the messages to/from each user 102 mobile POS 104 and provider 106 (POS 103), which are stored in a database storage 203. The STS 120 receives independently generated UPTF SAS mobile device POS authenticable transaction views (described in more detail further below) from both the user 102 and the provider 106 (POS 103) regarding a transaction conducted between them. The STS 120 is able to decode both of the views based upon information from UPTF SAS mobile device POS authenticable transaction messages and the information stored in the STS 120 database 203. Following successful decoding, the STS 120 verifies that the view messages are original, authentic, involve the intended user 102 and provider 106 and that the information fields in the transaction views are consistent with each other. The STS 120 can maintain a log of messaging activity for non-repudiation purposes. Therefore, the authenticable mobile POS 104 mobile POS application 109 is based on a general framework, called the Universal Pervasive Transaction Framework (UPTF), a generic new architecture and security protocol for conducting secure multi-party agreements, using mobile devices over a wireless transport network. The framework is designed to address several key aspects specific to the envisioned pervasive communication, including wireless, environments.

In FIG. 2, according to an aspect of the embodiments, the mobile device 104 mobile POS application 109 communicates with the POS 103 of the provider 106 via any short-range communication method 210 comprising an image, audio (sound, oral/written communication and recognition thereof, such as voice recognition), or wireless communication connectivity technology, or any combinations thereof. The range of the short-range communication 210 can be according to application design from a few inches or less to a predetermined area. The short-range communication 210 is typically non-secure by itself (meaning that the communication channel might not be secure, but the communication channel can carry a protocol, such as the UPTF SAS scheme, that has the desired security properties). Although the embodiments are not limited to such a configuration and the short-range communication 210 can be secure by itself and also carry the UPTF SAS protocol. The mobile device 104 mobile POS application 109 can also communicate with the STS 120 via a wireless communication channel 211, which is typically non-secure, and can be a wireless Internet, a mobile phone network, a local wireless network, or any combinations thereof. According to an aspect of the embodiment, the wireless communication channel 211 includes SMS and/or MMS. Thus, wireless UPTF SAS based messages are transportable over the wireless communication channel 211 using SMS messages to/from the STS 120, or using HyperText Transfer Protocol (HTTP), or web service calls, or other known wireless message transport services, or any combinations thereof. The provider 106 and the STS 120 can be separate or collapsed (as the case may be), and the provider 106 communicably connects with the STS 120 via known secure, non-secure, wire or wireless, or any combinations thereof communication channel(s) 220.

Figure 3:
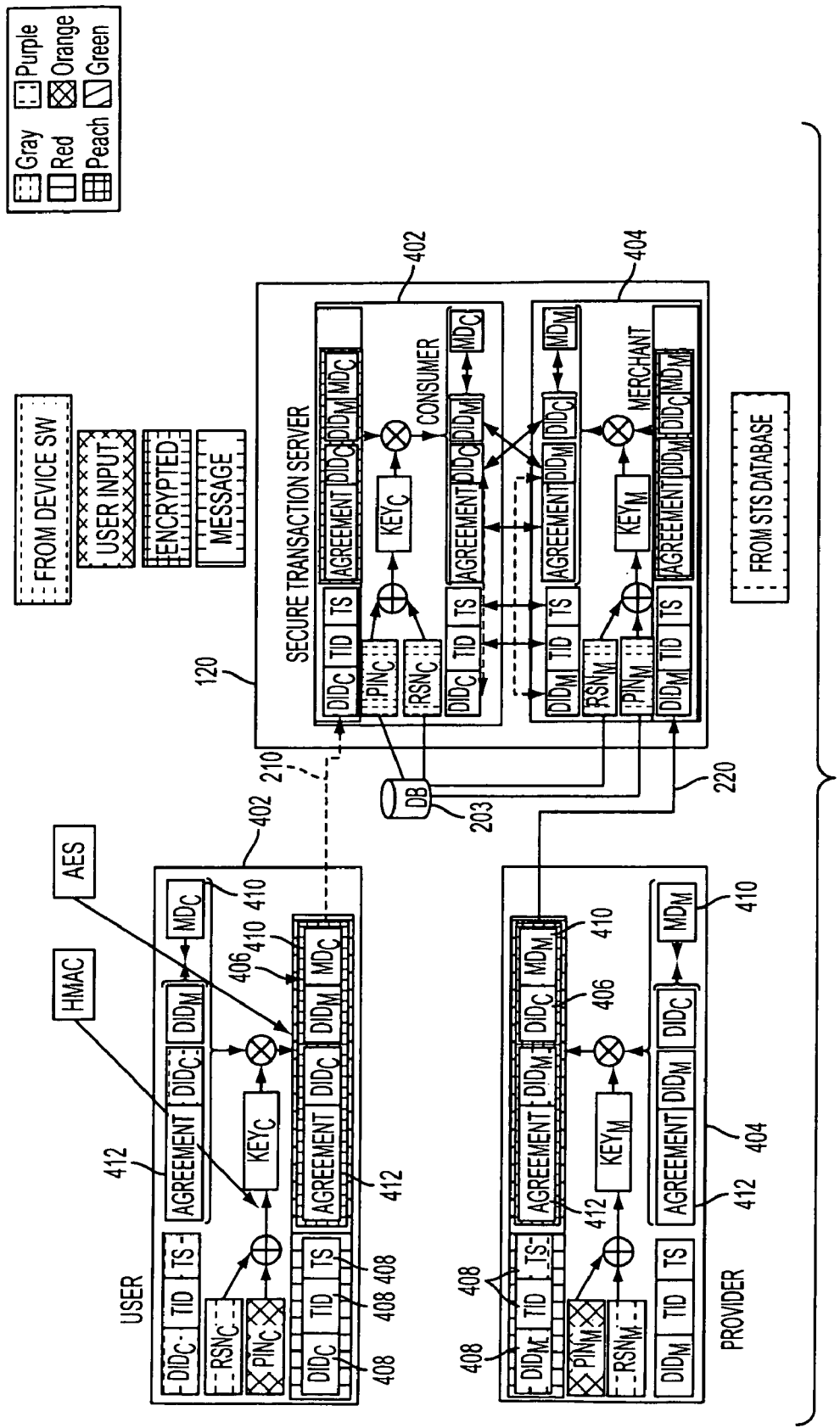
FIG. 3 is a diagram of UPTF mobile device POS authenticable transaction messages based upon Secure Agreement Submission (SAS) protocol to provide an authenticable mobile POS service, according to an embodiment of the present invention.

FIG. 3 is a diagram of UPTF mobile device POS authenticable transaction messages based upon Secure Agreement Submission (SAS) protocol to provide an authenticable mobile POS service, according to an embodiment of the present invention. The SAS protocol is used for encrypting and submitting views of desired UPTF based authenticable transactions. The message structure and encryption mechanism of SAS are designed to provide many of the desired security properties in an insecure pervasive communication, including wireless, environment for transactions, such as:

Authentication: the agreement parties and the verification party are authenticated to each other, as is the integrity of the agreement group;

Anonymity: agreement parties may remain anonymous to each other and personal and/or other account related information is not revealed to the other party;

Protection of the agreement content: the agreement is kept private, it is tamper-resistant, non-replayable, and strong non-repudiation properties are provided. In particular, a continuously changing, time dependent, device specific key is used to encrypt each view.

The underlying SAS algorithms are well-suited for a system using low-cost user devices, which have limited computing resources, while minimizing the complexity of use for the user. In addition, some of the information necessary to use the SAS, in particular a Personal Identification Entry (PIE), is not permanently stored on the mobile POS 104 and not included in any data transmissions, so if the mobile POS 104 is lost or stolen, the mobile POS 104 cannot be used. Additional details of the SAS and the encryption mechanism are provided with reference to FIG. 3, as follows.

FIG. 3 shows the internal structure and the generation process of a mobile device POS authenticable transaction view messages 402, 404 (i.e., UPTF SAS authenticable transaction messages among a mobile device 104, a POS 103 and an STS 120). The provider 106 includes a provider device 103, such as a POS 103, on which the provider UPTF based transaction messages are implemented. The UPTF SAS based views 402, 404 are also implemented in software and/or computing hardware as the mobile POS software 109 that is executed in the mobile POS 104. Since the views 402, 404 from the user 102 and the provider 106, respectively, are symmetrical, the user's 102 view 402 is only described. The identifiers used in FIG. 3 are explained below:

DIDc: device ID, a unique identifier for the mobile POS 104 (the user consumer (c) or source transaction party).

DIDm: device ID, a unique identifier for the provider 106 POS device 103 (the merchant (m) or destination transaction party).

RSN: random sequence number.

TS: local current timestamp.

TID: transaction ID, a unique identification number assigned to an agreement, which is maintained by the STS 120 to identify corresponding UPTF agreement views 402, 404. For example, a purchase transaction identifier uniquely identifying a particular purchase.

MD: message digest 410

PIE: Personal identification entry, a user and STS 120 maintained input secret entry, such as an alphanumeric string. In a typical embodiment described herein, the PIE is only maintained by the user and the STS 120, is not known to and/or maintained by another party to a transaction and/or any financial institutions and is temporally known as an intermediate parameter to the mobile POS 104 of the user 102 for encrypting the user transaction view 402. More particularly, the PIE is not included in transaction messages (e.g., UPTF SAS messages and/or SAS based informational messages) and, thus, the mobile POS 109 does not transmit the PIE. The PIE can be non-secure by being a substantially short alphanumeric string, such as a 4 digit number. The user enters the PIE whenever the user attempts a transaction. Preferably the PIE is issued to the user when the user registers for the authenticable mobile POS service using a client device 104, which executes the mobile POS 109. The user can also select the PIE at such time of registration. The PIE is, however, a piece of highly secure information in the sense that it is never transmitted during the UPTF protocol execution, it is only known to the user and the STS 120, and its secrecy should be well protected. The PIE can be input by the user on a mobile POS 104 in a secure fashion or it may be deterministically generated using a biometric device, such as a fingerprint sensor. For example, a computation applied on the fingerprint data received from a fingerprint sensor can be used to generate a PIE that is initially communicated by the user to the STS 120. Whenever the user attempts a transaction, the user applies her finger to the fingerprint sensor, thus generating the PIE. The PIE is not kept in permanent storage on the mobile POS 104, but is used as an intermediate parameter required for the generation of the encryption key for a transaction and the mobile POS 104 should not retain the PIE for a period longer than a transaction execution time as determined according to application criteria. If a particular implementation of the present invention uses a form of PIE that is not convenient for a user to input for each agreement transaction and the device needs to store its user's PIN, the storage must be secure and tamper-resistant. According to another aspect of the embodiment, the PIE can be a user 102 biometric input data.

As shown in the FIG. 3, a view 402 comprises a cipher text part (or encrypted part) 406 and a perceptible (e.g., plaintext) part 408. A plaintext part 408 includes the TID, the DIDc of the mobile POS 104 generating the view 402, and the local current timestamp (TS) of device 104. The TS, among other functions described herein, is also used to prevent transaction replay. The encrypted part 406 includes two critical fields: the agreement data (transaction data) and the DIDm of the provider's 106 POS 103 device involved in the agreement. The DIDm is the minimum necessary reference field to provide the desired verification properties of the UPTF protocol. According to an aspect of the embodiments, the DIDm is communicably provided to the user 102 and/or the mobile POS 102 via any known methods, for example, via the short-range communication 210. Therefore, a user can execute a mobile POS 104 authenticable transaction with a transaction party based upon a PIE and a mobile POS application 109 authentication parameter RSN, and authenticable transaction messages comprising an identifier of the mobile device POS 104, an identifier of the transaction party, and an identifier for the transaction (for example, an identifier and/or other transaction related data, such as a type of transaction, payment amount, etc.), thereby providing the mobile POS 104 based upon a combination of the mobile POS application 109 at the mobile POS 104 and the STS 120 association of the PIE and an authentication parameter, which is known and/or determinable by the devices 103, 104 and 120, with the user 102, and exchange of the authenticable transaction messages among the user 102, the provider 106 (POS 103) and the STS 120.

First, DIDc and the TS obtained from the mobile device 104 local clock (and/or as provided as a part of the agreement data) are utilized by the device's 104 pseudorandom number generator to generate a time-dependent RSN. Therefore, the parameters of the generator are particular to each device 104. The encryption key K is then generated from the RSN and user input PIE (shown in FIG. 3 with orange coloring), where the PIE is provided from or generated by the STS 120. Firstly, the RSN and PIE are combined using a function F and then a hash function H is applied to the result (typically a string) to generate the encryption key:

K=H (F ((PIE, RSN))

A message digest 410 function can be applied to the agreement data, the DIDm, and the DIDc to generate a MD of the view. According to an aspect of the embodiments, the MD 410 is generated by applying a hash function to the UPTF SAS agreement data as shown in FIG. 3 to shorten the same. The MD can further strengthen the security by ensuring that no other party has tampered with or modified the contents of the view 402 in any way. The encryption algorithm with the encryption key K is then applied to the MD, the agreement data, the DIDc, and the DIDm to generate the cipher text part of the view 402, as shown in FIG. 3 with peach coloring. For further protection, the SAS protocol uses random message padding in order to further prevent "known-text" attacks. According to an aspect of the embodiment described herein, the embodiment uses Advanced Encryption Standard (AES) for encryption, a Keyed-Hashing for Message Authentication (HMAC)-based scheme for random number generation, and SHA1 Secure Hash Algorithm for the hash function.

The STS 120 has sufficient prior knowledge of the functions and specific parameters used by each device 104 in the encryption process, so that when combined with the plaintext portions of a message 402, 404, it is possible to decrypt the message 402, 404 by reversing the above process. For example, from the plaintext part 408 of the view 402, the STS 120 recovers the DIDc and TS, which are used to look-up the customer's 102 PIE and other parameters of the RSN generator that can be stored in the STS 120 database 203. These are used to compute the RSN. The encryption key K can then be computed using the same method with which the device 104 generates the encryption key. The cipher text part 406 of the view message 402 is then decoded.

After all applicable fields of the user 102 view 402 are acquired, the STS 120 locates the provider's 106 view 404 for the same transaction, using the DIDm and TID included in the previously decoded user 102 view 402. After going through a similar decryption process, the decoded fields of the agreement data of the provider 106 view 404 are compared with the corresponding fields from the user 102 view 402. If all applicable corresponding fields match (correspond according to application design), the received views 402, 404 are considered verified. Further processing is then carried out and external executions are triggered as necessary.

Any responses from the STS 120 to the user 102 or provider 106 are encrypted by the STS 120 using the same encryption methods and using the parameters for the destination devices 104, 103 and the TS of the original transaction. Only the intended recipient can decrypt the response message, insuring privacy protection and authentication of the STS 120.

Another example encryption key generation for the UPTF SAS is described herein. In FIG. 3, using the view 402, the key KEYc is a hash of a RSNc and a PIEc; the detailed key generation procedure is as follows:

The initialization data for the RSNc are created when the STS 120 creates a new authenticable mobile POS service account (e.g., when the mobile POS 109 is created or initialized by the STS 120). Specifically:

1. a random 128-bit seed is generated using a software service function.

2. a random 160-bit initialization timestamp is created also at new authenticable mobile POS service account creation time, using software service function. Therefore, the STS 120 can generate or provide device 104 specific initialization parameters of a random number and an initialization time stamp, both of which are provided (installed) via the mobile POS application 109 to the mobile device 104.

The PIE creatable by the STS 120 when a new account is created at the STS 120, as follows: a 32-byte random value is created using a software service function, convert each byte to a decimal value string, and concatenate them all to produce a long string. Randomly chop 4 digits from this string to create PIE.

When the key needs to be created in order to encrypt a transaction message, the following steps take place:

1. A 160-bit current timestamp is generated, as follows:

a. Convert current time to string, for example, converting the current time to a 16 characters string, e.g., 5:04 pm, Jan. 26, 2006 is written in "0000170401262006."

b. Take the string and a one way function to output another value, for example by hashing the current time string using SHA1 algorithm, which produces a 160-bit output.

2. XOR an init timestamp and current timestamp to produce a 160-bit output. This operation is essentially a form of deterministically calculating a difference between two values of time (i.e., a deterministic transformation between two values).

3. Use the 128-bit seed software authentication parameter as data, and the XORed value of the two time stamps as the key, compute the HMAC result (a 160-bit value). The result of the HMAC is the RSNc. Use of the HMAC accommodates unpredictability in the RSNc generation.

4. Chop the first 128-bit of the HMAC result, combine (e.g., concatenate) with the 32-bit PIE (convert from a 4 digit string) for a 160-bit value.

5. Compute the hash (SHA1) value of the 160 bit stream in operation (4), and chop the first 128 bit as the final key.

In the encrypted part of the message a hash of the transaction part of the message (with the padding) using SHA1 (alternatively a CRC can be used) is used.

In the above-described embodiment, the values of a number of bits are provided as unlimiting examples, and the present invention is not limited to a specific number of bits values. Therefore, as illustrated with reference to FIGS. 2 and 3, a UPTF SAS based transaction requires a device 104 which provides device-specific parameters that determine a device-specific and time-specific key and an operator for the device 104 who provides a PIE determinable only by the STS 120 and the operator. The combination of the two is required for an encrypted transaction request that can be validated by the STS 120. Intercepting one (or more) transaction message and successfully decrypting it would not be sufficient for purposes of inferring either the PIE, or the device specific parameters employed in the key generation process. Moreover, a single, time-dependant key is not re-usable because of the pair-wise agreement notion of transactions processed by the STS 120.

According to an aspect of the embodiments, the STS 120 can reset the RSN seed after every successful response from STS 120 to a device 103, 104; after that the STS 120 will expect the new seed to be used by the devices 103, 104. The seed can be derived as follows:

(1) use a predetermined portion of the message padding, and/or (2) include the new seed in the STS's response (in the transactional content of the response) to the devices 103, 104.

Figure 4:
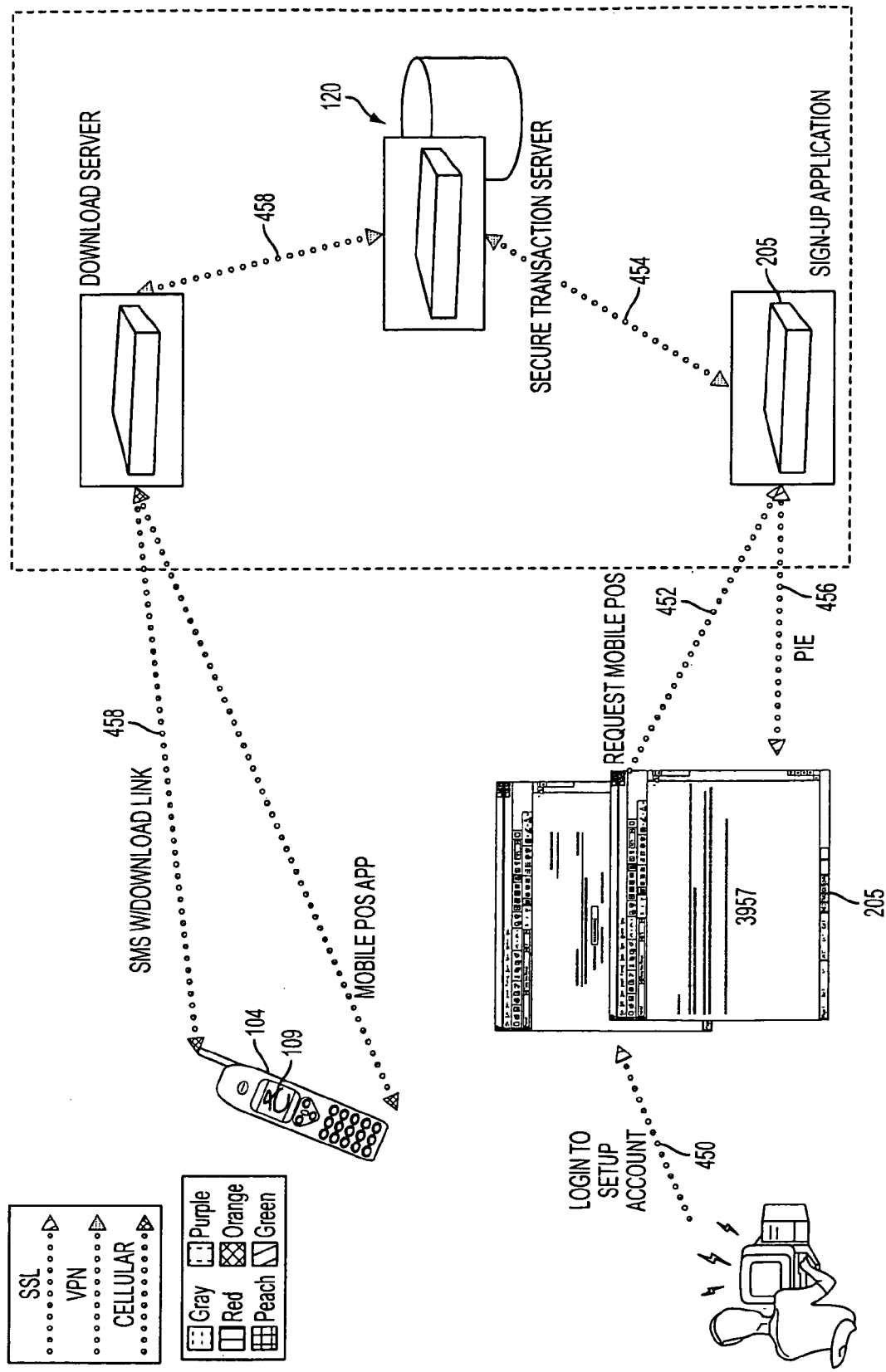
FIG. 4 is a system flow diagram of provisioning a mobile POS, according to an embodiment of the present invention.

FIG. 4 is a system flow diagram of provisioning (i.e., "providing a service," which includes distribution to a user and associated system actions) a mobile POS 104, according to an embodiment of the present invention. In FIG. 4, a mobile phone is used as an example mobile POS 104. A method, comprising, at operation 450, a user 102 logs into a mobile phone POS service registration site 205. For example, the provider 106 and/or the STS 120 with which various providers 106 participate can provide the mobile POS service registration. At operation 452, the user selects a mobile POS service, which according to an embodiment is a mobile POS application 109 download request from the provider 106. However, the embodiments are not limited to a configuration of downloading a mobile POS application 109 to the mobile phone 104, and a mobile POS 104 can be activated through other techniques, such as (without limitation) pre-installed software and/or computing hardware (e.g., an integrated circuit), so long as a mobile POS 104 authenticable by the STS 120 is provided. At operation 454, the provider 106 device 205 communicably connects with the STS 120 for providing a mobile POS 104.

In FIG. 4, the method at operation 454 further comprises initializing, at the STS 120, a mobile POS application 109 with software authentication parameter(s), as an authentic mobile POS application 109. Also, at operation 454, correlating, at the STS 120, a personal identification entry (PIE) (e.g., a PIN) and an identifier of the mobile phone 104 with the authentic mobile POS application 109. At operation 456, the PIN can be communicated to the user 102. Of course, at operation 450, the user 102 can supply a PIN. At operation 458, installing, in the mobile phone 104, the authentic mobile POS application 109. According to an aspect of the embodiment, at operation 458, the mobile phone 104 receives a Short Message Service (SMS) with a download link to the authentic mobile POS application 109. At operation 462, the user 102 can download the authentic mobile POS application 109. When the authentic mobile POS application 109 is installed in the mobile phone 104, the user can execute, at the mobile phone 104, the installed authentic mobile POS application 108 using the PIE (e.g., PIN) to execute a mobile phone POS authenticable transaction as an authenticable mobile POS 104.

According to an aspect of the embodiment described herein, at operation 454, one or more software authentication parameters are selected, which can be (without limitation) creation of a new seed, such as a new random seed number, and an initialization time. At operation 454, the STS 120 stores in a database 203, a unique identifier (referred to as Device ID, or DID) for the mobile phone 104, which can, for example, be a mobile phone number of the mobile phone 104 or some randomly generated globally unique identifier (GUID), a mobile phone carrier (as the case may be), or the software authentication parameter(s), and the generated PIE, or any combinations thereof. According to an aspect of the described embodiment, a mobile phone number can also be used as a device identifier for the mobile phone 104. The unique identifier (device ID (DID)) of the mobile phone 104 is used by the STS 120 to correlate a transaction message with the authentic mobile POS application 109 (i.e., to correlate the DID with the software authentication parameter(s) and the PIE stored at the STS 120, so that the STS 120 can generate a key that corresponds to a device 104 having the DID. The mobile phone number can be used to communicate short messages (e.g., notifications, etc.) with the mobile phone 104 (e.g., Short Message Service (SMS), including (and/or) Multimedia Message Service (MMS)). The mobile phone 104 can be an Internet enabled, according to known techniques, mobile phone. According to an aspect of the embodiment(s) described herein, a mobile device POS authenticable transaction message is bound to a unique combination of a user 102 and a mobile POS 104, the binding to the user is via the PIE and the binding to the device 104 is via the software authentication parameter(s) of the authentic mobile POS app 109. In particular, a transaction is an SAS based encrypted message and the encrypted message can be traced back to a combination of the user 102 and the device 104 through the PIE and the software authentication parameter(s) of the authentic mobile POS application 109. Similar binding applies with respect to the POS 103 transaction messages.

According to an aspect of the embodiments, a variation on the sign-up and registration process, which could be particularly useful for person-to-person payments, in which the payer is the payer mobile POS 104a and the payee serves as a payee mobile POS 104b, is described next. This method has the advantage that it does not require that a payee is already signed-up with a payment service to receive payment by a payer mobile POS 104a. A user with mobile POS application 109 on the mobile phone 104 can make a payment to another mobile phone owner that is not registered yet for the mobile POS service. The first user specifies the recipient of the payment via the mobile phone number of the second user. The second user subsequently receives an SMS at the second user's mobile phone with the aforementioned phone number. The SMS informs (with text) the second user of a pending payment to the second user and includes a link for downloading the mobile POS software 109. A version of the mobile POS software 109 for this specific second user was created at the STS 120 upon receipt of the first payment request to the STS 120 from the first user. Upon completion of the download, the second user needs to register for the mobile POS service to complete receiving payment. To maximize security, it is preferred that the second user does the registration at the provider's website, as discussed with reference to FIG. 4. Alternatively, the registration can be done from inside the mobile POS application 109, by invoking a "new account" action.

Wireless communication computing apparatus/device transactions with a physical Point of Sale (POS) are described next. The methods and systems described have several variations that make tradeoffs between various categories, such as convenience to the customer, security, time of transaction, local communication and cellular network communication. For example, whether a customer needs to type any transaction identifying information into the phone is one category. In the case of a mobile phone, another category is whether the transaction can be accomplished with or without any information transmitted over the cellular network.

METHODS (SYSTEMS): The discussed methods/systems consider the following options to better conform to the requirements of the cell phone-POS purchasing environment and constraints:

Communication mechanisms: Several communication mechanisms are utilized by these methods. These are roughly characterized as "local communication" (short-range communication methods 210) and "remote communication":

Local communication is considered to be

1. Image, such as any type of barcode and scanner thereof, camera, scanner, or any combinations thereof at the POS 103 and/or the mobile POS 104. According to an aspect of the embodiments, the barcode system is capable of processing 2-Dimensional barcodes.

2. Audio, such as any output audio signal or Dual Tone Multi-Frequency tone, or voice, or any combinations thereof, and recognizer(s) thereof at the POS 103 and/or the mobile POS 104.

3. Radio Frequency (RF) (Radio Frequency Identification (RFID), Bluetooth, WLAN, NFC, etc., or any combinations thereof at the POS 103 and/or the mobile POS 104

Remote Communication is considered to be

1. Short Message Service (SMS), Multimedia Messaging Service (MMS)

2. Wired Internet

3. Cellular Internet (wireless Internet access through the mobile telephone network as implemented according to known techniques)

Message Lengths: Several options for decreasing the size of the UPTF messages are incorporated. The messages can be either:

1. The full UPTF message is used as the transaction authorization message, and/or 2. The Message Digest MD 410 of the mobile POS 104 UPTF message is used as the transaction authorization message of the consumer; using the MD instead of a full UPTF message results in a shorter message length.

3. One-time transaction code—A one-time use random number, called the C-Nonce, generated by the phone using the UPTF key generation scheme to indicate that the customer authorizes the transaction.

Computation reductions: To avoid burdening the phone or the POS equipment 103, the "local send" messages, or rather, their representations (image or audio signal) can be transmitted "as is" by the POS 103 to the STS 120, i.e., there is no conversion of the signal to a UPTF message at the POS 103; rather the STS 120 performs such conversion.

CONSTRAINTS: To understand the described process flows and the related actions, the following constraints should be taken into consideration. The purpose of these constraints is to further the understanding of why the actions have been defined as they have.

Message Length: If sending a SMS to STS, message length preferably needs to comply with applicable SMS, network, phone model, and/or wireless service provider/carrier (as the case may be) requirements for delivering the short messages. For example, message length might need to be <=160 chars, which means either no padding or use of the UPTF SAS based Message Digest (MD).

If a MD is used there can be no padding since then the STS 120 will not know where the payload of the encrypted message begins and ends.

Some barcode types require MD instead of full encrypted message, because they cannot accommodate a full UPTF message length.

The MD with timestamp and DID requires about 16 bytes (for Timestamp), plus 8 Bytes (for DID), plus possibly 10 Bytes (for TID), plus the MD length (typically 16-20 Bytes, although it can be less), for a total of between 40-54 Bytes (typically). By contrast, a full UPTF message's length can vary between 100 and 1024 bytes depending on the message type and the amount of padding If the MD is used and the message is sent by SMS or MMS, a TID is necessary for the STS to identify which merchant message the customer message matches with. An alternative is to provide the POS ID and transaction amount to the mobile POS application 109. In general, the mobile POS application's 109 and the POS's 103 UPTF messages are not sent in the same communication, although the embodiments are not limited to such a configuration and the mobile POS software 109 and POS 103 UPTF message can be sent in same communication.

The payment account by the payer 102 selection is always optional, and since some of the embodiments are "off-line" schemes, the selected account can be drawn from default settings.

Regardless of using MD or full message, the DID and timestamp are necessary in the unencrypted part of the UPTF message so that the STS 120 knows where and when the message came from and the STS 120 can successfully decrypt the UPTF message.

ACTIONS: Several variations are described based on whether the phone 104 and the POS 103 use short-range communication 210 and whether the transaction details (e.g., merchant ID, amount) are entered by the customer or received automatically via local 210 or remote communication 211.

Table 1 lists the embodiments and variations therefore as described herein. Table 1 lists mobile device 104 with POS 103 transaction variations including communication modes of the mobile device 104 with the POS 103 and/or the STS 120. In particular, for example, in Table 1, variation 1 is applicable when the mobile phone 104 uses SMS to the STS 120 to communicate a UPTF SAS transaction message, and variation 2 is applicable when the mobile phone 104 uses SMS to the STS 120 or when the mobile phone 104 uses a short-range communication method to the POS 103, and so on.

TABLE 1

| Variation nos./mobile device 104 communication modes | 1 | 2 | 2-1 | 3 | 3-1 | 4 | 4-1 |
|---|---|---|---|---|---|---|---|
| Mobile Device Mode 1: Phone uses SMS to STS | X | X | | X | X | X | |
| Mobile Device Mode 2: Phone uses short-range communication method to POS | | X | X | | | | X |
| Mobile Device Mode 3: Phone receives amount and approves | | | | | | X | X |
| Mobile Device Mode: 4 POS uses short-range communication to phone | | | | X | X | X | X |

The steps involved with the embodiments and variations thereof are described with reference to FIGS. 5-16. FIGS. 5-16 are flowcharts of mobile device to POS authenticable transactions, according to the embodiments of the present invention. According to an aspect of the embodiments, the user/customer/client 102 and mobile device 104 can be collapsed together, since the mobile device 104 can automatically generate and/or reply to any UPTF SAS based transaction messages, obviating any user input.

Figure 5:
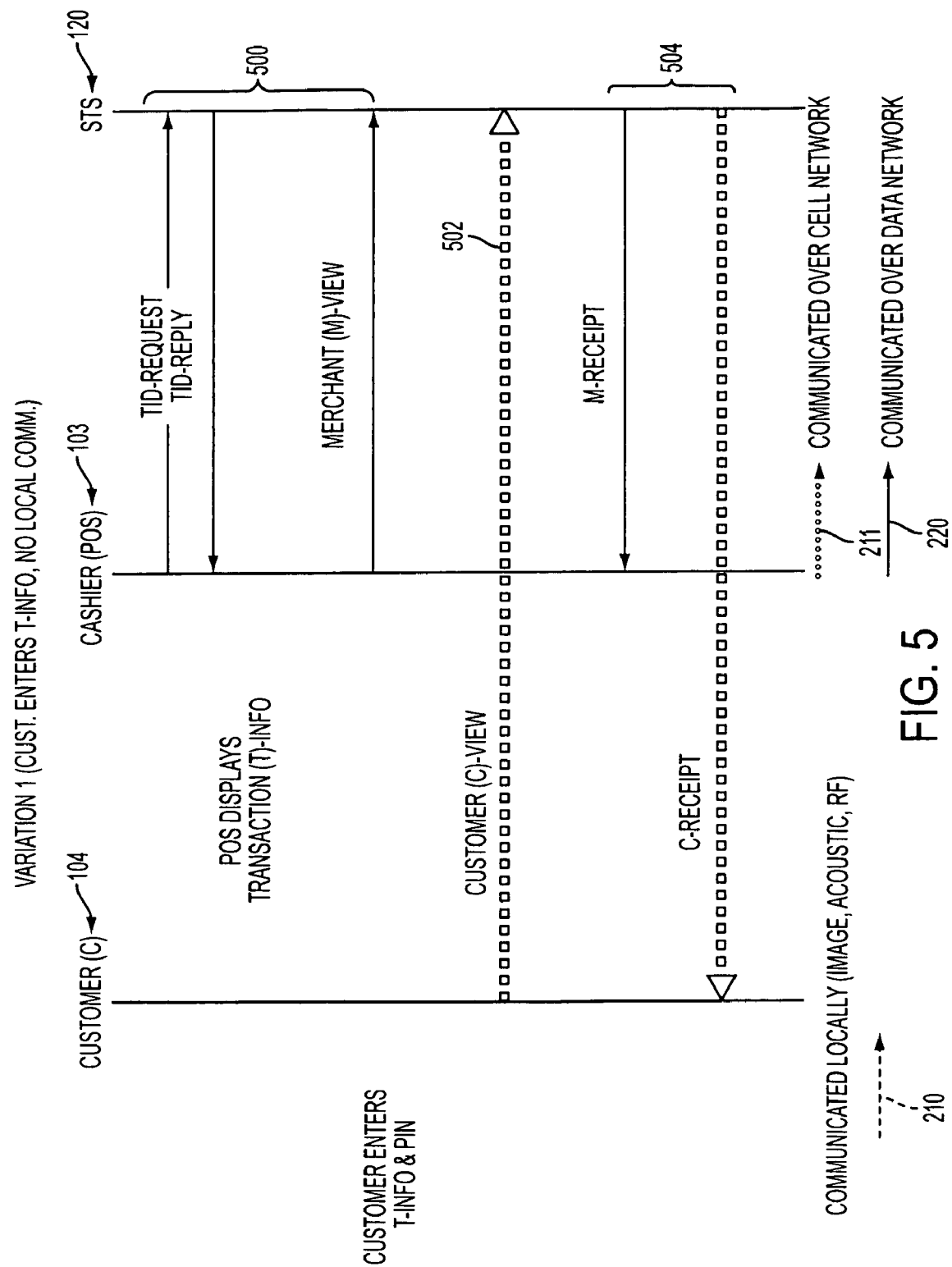

FIG. 5 is a flow chart of variation 1: Remote Communications 211 with the mobile POS 104.

Step 500. The merchant (cashier POS 103) sends a UPTF message to the STS 120 requesting a transaction ID and receives a transaction ID (TID) reply from the STS 120. The merchant displays the details of the transaction on a monitor (as in a normal store). This information may include the amount, a transaction ID and/or a POS ID to identify the merchant. Then, the merchant sends a UPTF message to the STS 120, called the M-View 404, with the encrypted portion 406 containing the POS ID, transaction ID, the amount, the Time stamp (but may or may not contain the device ID of the mobile POS 104), using its preferred connection. According to an aspect of the embodiments, if the views 402, 404 do not contain a device ID, the transaction ID (since both the mobile device 104 and the POS 103 point to the transaction identifier) can be usable to bind the views 402, 404 for STS 120 authentication and verification.

Step 502. The customer launches the mobile POS application 109 and enters the transaction ID and/or the POS ID as obtained from the merchant in operation 500. The customer enters the PIN. The customer selects an account. The mobile POS application 109 sends a UPTF message to the STS 120 using a cellular network 211, called the C-View 402. The encrypted portion 406 contains the transaction ID, the account, the time stamp and may or may not contain the POS ID. According to an aspect of the embodiments, the UPTF SAS message 402, 404 agreement data 412 can be explicit transaction information, and/or implicit or abstracted transaction data, such as the transaction identifier (TID) (as the case may be).

Step 504. The STS 120 receives the messages from the merchant 103 and the client 104. The STS 120 decodes the messages and verifies the identity of the parties. The STS authorizes the transaction. The STS 120 sends receipt messages to the merchant using its preferred connection 220 and to the customer over the cellular network 211.

FIG. 5 variation uses the remote messaging over the cellular network 211 to perform the communication from the customer. This customer never explicitly acknowledges the amount of the transaction, except implicitly by optionally typing in the transaction ID and PIN. In general, this method of transaction has been discussed in the above-identified related co-pending patent applications.

Figure 6:
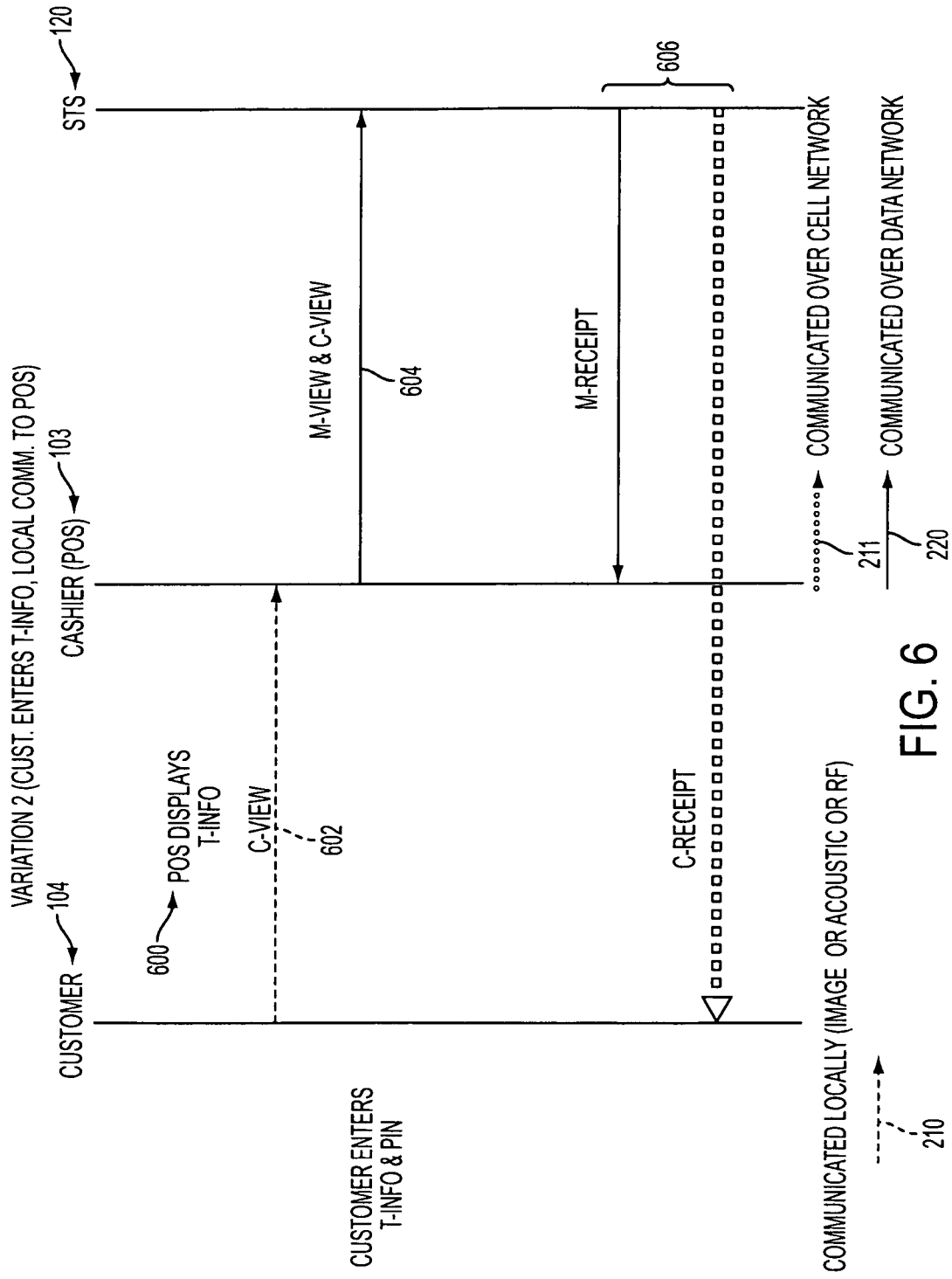

FIG. 6 is a flowchart of variation 2: Local Communication 210 between the mobile POS 104 and the POS 103.

Step 600. The merchant optionally sends a UPTF message to the STS requesting a transaction ID (see operation 500). The merchant provides the details of the transaction, for example, on a monitor (as in a normal store). This transaction information may include the amount, a transaction ID and/or a POS ID to identify the merchant 103.

Step 602. The customer launches the mobile POS application 109 and enters the transaction ID and/or the POS ID as obtained from the merchant in operation 600. The customer enters the PIN. The customer selects a payment account. The mobile POS application 109 locally via a short-range communication 210 sends a UPTF message to the merchant 103 using the preferred local medium 210. The message can be a complete C-View 402, where the encrypted portion 408 contains the time stamp, a nonce, and optionally contains the transaction ID, the account, and/or the POS ID. If the length of the message is constrained, it is possible to send a shortened message consisting of the digest or the nonce.

Step 604. The merchant 103 receives the local communication and sends both its UPTF M-View 404 message and the received C-view 402 to the STS 120 via the communication channel 220. For example, the encrypted portion 408 of the M-view 404 containing the POS ID, the amount, the Time stamp, optional Transaction ID (but no device ID), is transmitted from the POS 103 to the STS 120 using a preferred connection 220.

Step 606. The STS 120 receives both the messages from the merchant 103 and the client 104. The STS 120 decodes the messages and verifies the identity of the parties. The STS authorizes the transaction. The STS 120 can send receipt messages to the merchant using its preferred connection 220 and to the customer over the cellular network 211.

FIG. 6 variation uses the local messaging 210 to perform the communication from the customer. For example, after the customer types in the PIN to authorize the transaction, the mobile phone 104 creates a 2-d barcode containing the complete C-View 402 message. The customer holds the phone display to an imager at the POS 103 that records the barcode and creates a digital message. Again, this customer never explicitly acknowledges the amount of the transaction, except implicitly by typing in the transaction ID and PIN. The receipts are delivered by the cellular network 211 to the phone 104.

Figure 7:
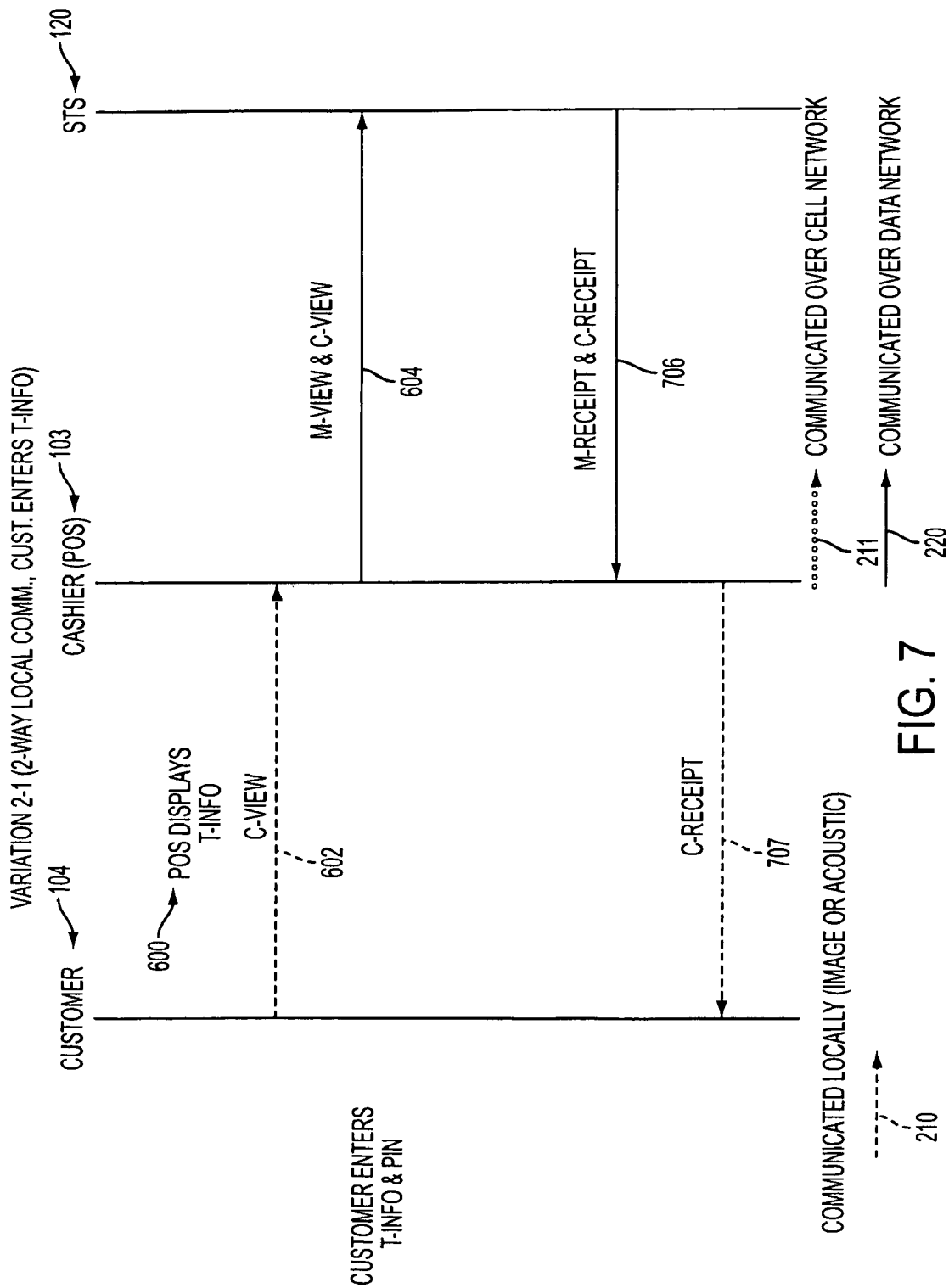

FIG. 7 is a flowchart of variation 2-1: If the phone 104 is capable of receiving local communication via a short-range communication 210 from the POS 103, then, at operation 706 (606 in FIG. 6), the receipts can be delivered by the STS 120 to the POS 103 and the POS 103 can transmit the customer receipt to the phone 104 via local communication 210. This will avoid the need for the mobile POS 104 to have any remote communication 211, thus reducing communication 211 traffic and cost.

Figure 8:
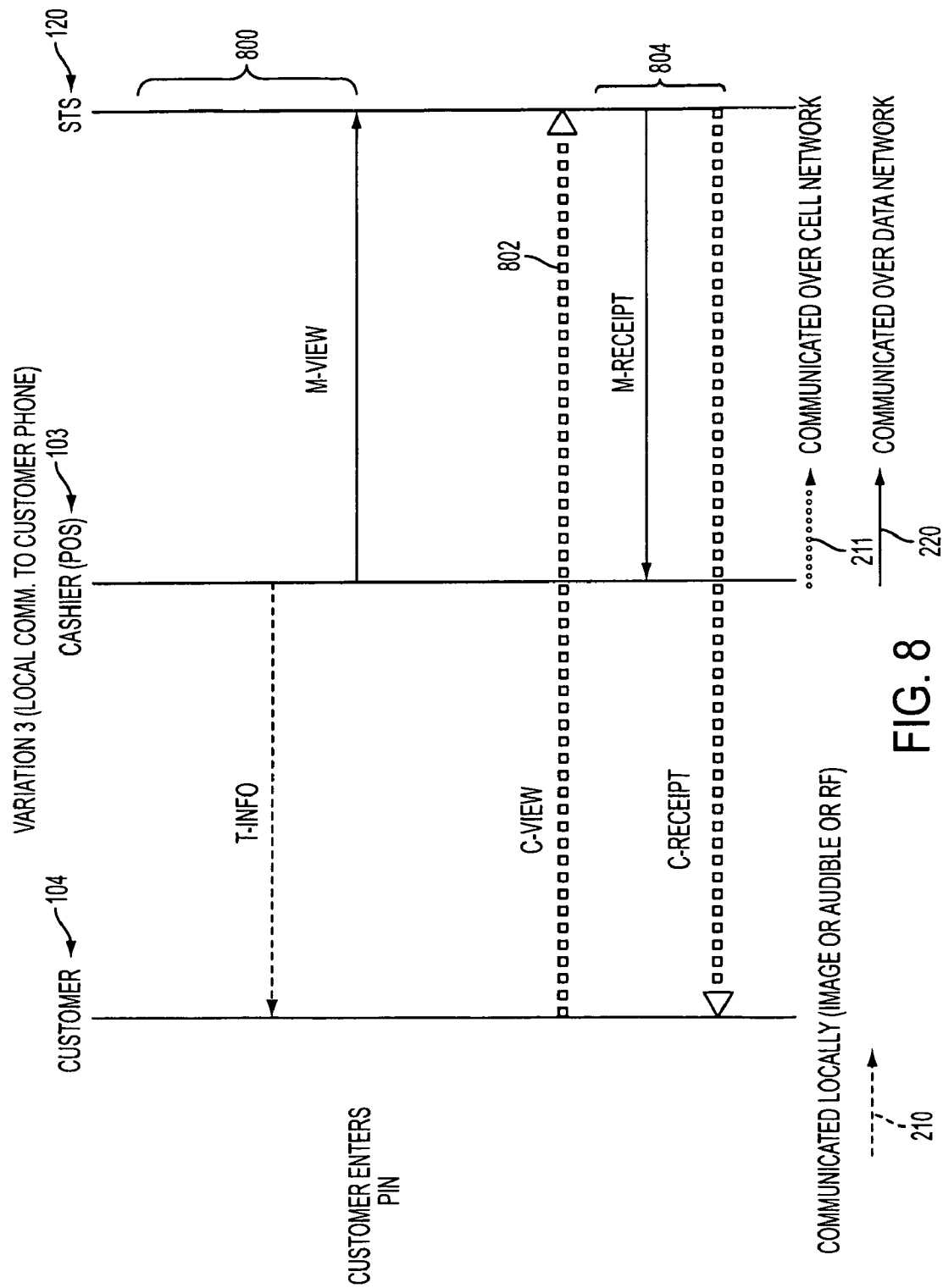

FIG. 8 is a flowchart of variation 3: Local Communication 210 from the POS 103 to the mobile phone POS 104:

Step 800: The POS 103 generates a local message via a short-range communication 210 to the phone 104, called the T-Info that contains the transaction ID, the amount and the POS ID. The POS 103 also generates an M-View 404 and sends the same to the STS 120.

Step 802. The customer starts the mobile POS application 109. The phone 104 receives the local message from the POS 103 and decodes the data. The user is asked to approve the transaction by entering the PIN. The Phone 104 generates a C-View message 402 containing a full UPTF message for the transaction. The phone sends the C-View message 402 via the cellular network 211 to the STS 120.

Step 804. The STS 120 receives the messages 402, 404 from the merchant 103 and the client 104. The STS 120 decodes the messages and verifies the identity of the parties. The STS 120 authorizes the transaction. The STS sends receipt messages to the merchant 103 using its preferred connection 220 and to the customer 104 over the cellular network 211.

Figure 9:
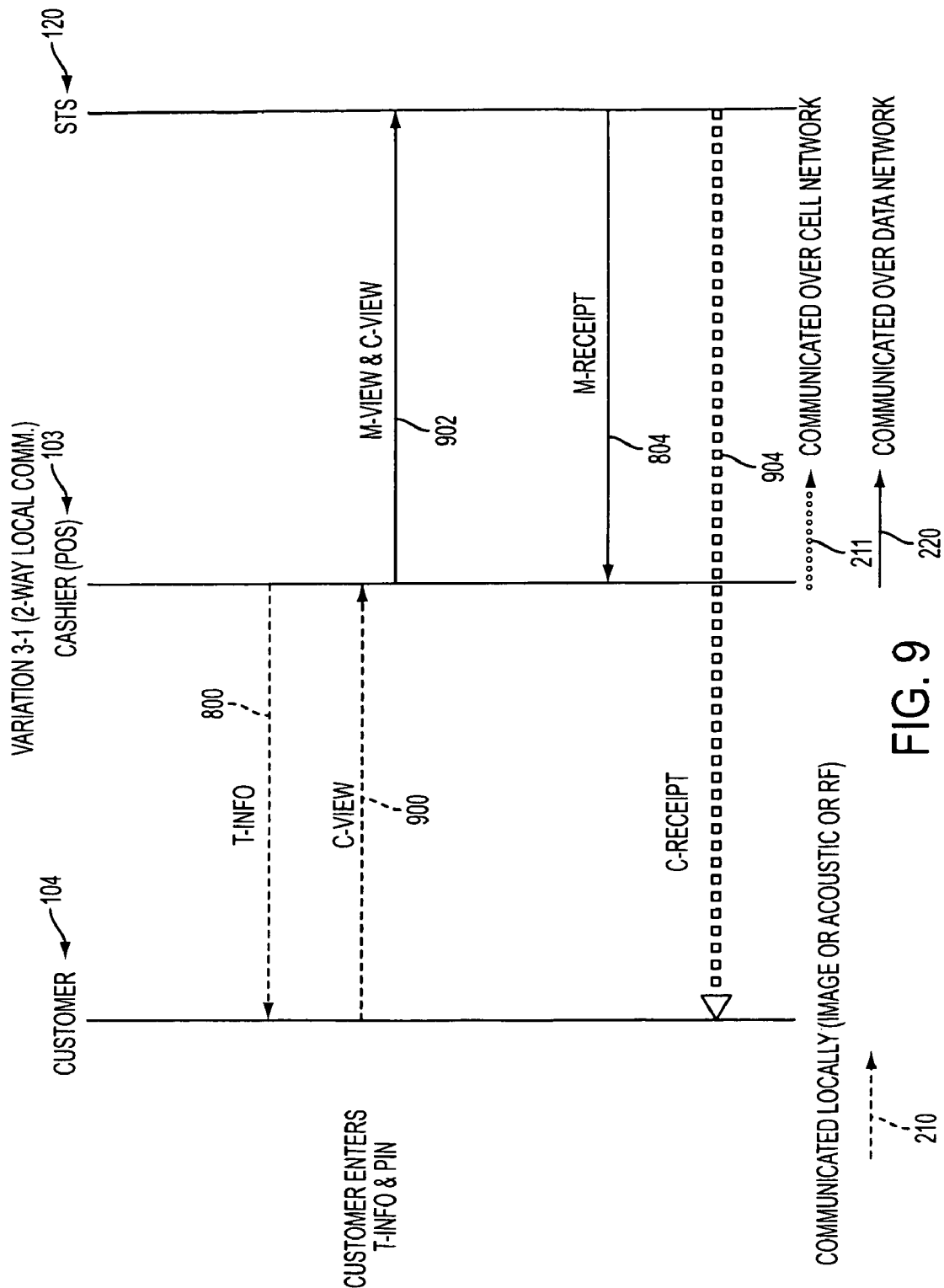

FIG. 9 is a flowchart of variation 3.1: This variation uses 2-way local communication 210, i.e., both the phone and the POS are capable of local communication via a short-range communication 210. At operation 900, the C-View 402 is first sent to the POS 103 as a local message, and, at operation 902, the POS 103 relays the same along with the M-view 404 to the STS 120. Also, at operation 904, the merchant 103 sends the phone receipt to the phone 104 as a local message via the short-range communication 210.

Figure 10:
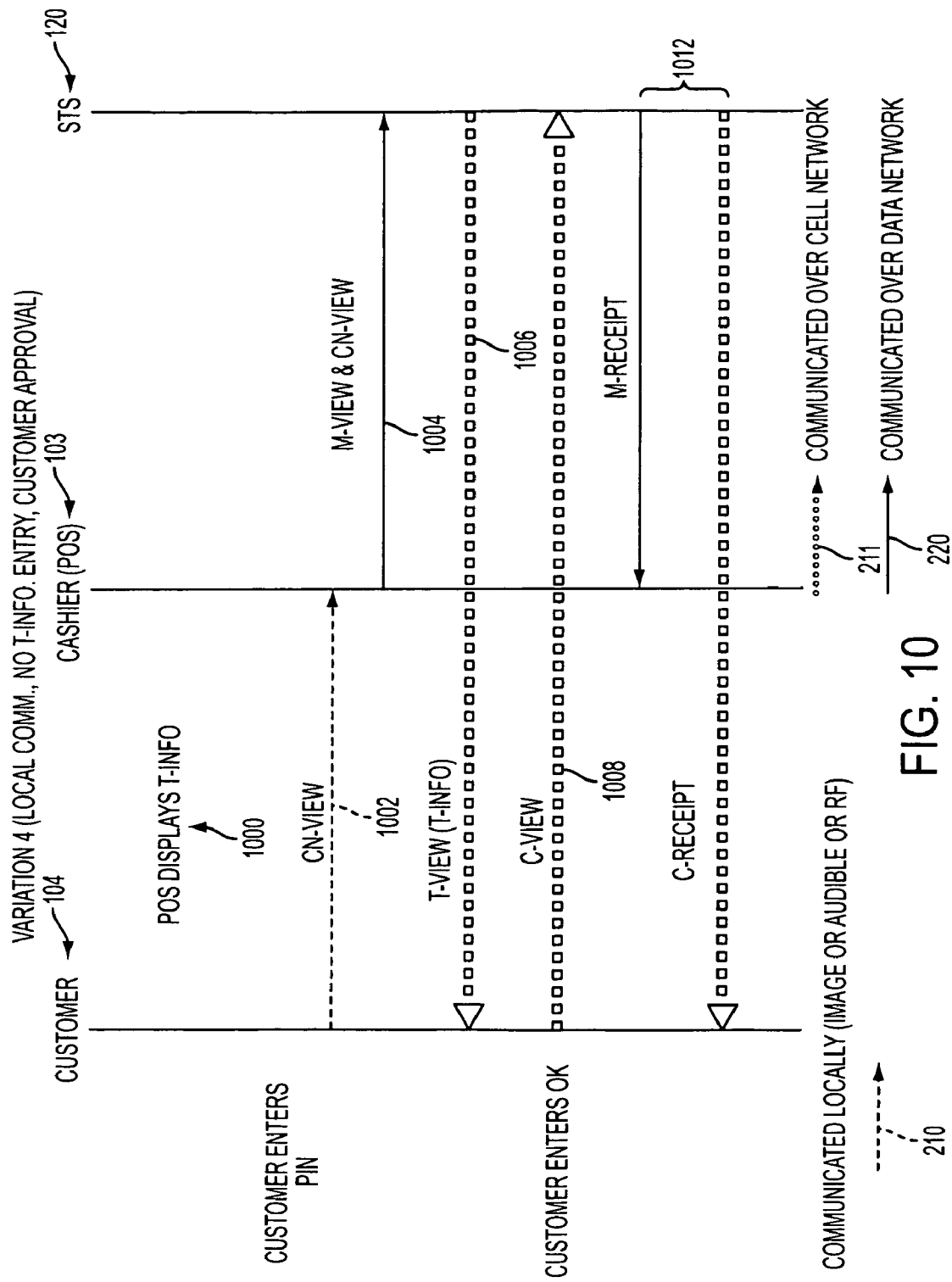

FIG. 10 is a flowchart of variation 4. This variation uses the cellular network 211 to send the transaction data to the phone 104.

Step 1000. The merchant 103 provides, for example, displays on a monitor, the details of the transaction (as in a normal store). This information may include the amount, a transaction ID and/or a POS ID to identify the merchant.

Step 1002. The user starts the mobile POS application 109 and enters the PIN. The phone 104 sends a message to the POS 103 to identify itself using local communication 210. The message, called a CN-View 402 contains the device ID and a nonce.

Step 1004. The merchant 103 sends both the M-View 404 and the CN-View 402 to the STS 120. The M-View 404 has the encrypted portion 406 containing the POS ID, transaction ID, the amount, and the Time stamp (but no device ID).

Step 1006. The STS 120 generates a UPTF message for the mobile POS 104 called the T-View that contains the transaction information, including amount, via the cellular network 211, based upon the received M-view 404 and the CN-View 402 in operation 1004.

Step 1008. The customer 104 approves the transaction by selecting OK and a C-View message 402 is generated. The C-View message 402 is sent to the STS 120 over the cellular network 211.

Step 1010. The STS 120 receives the messages 402, 404 from the merchant 103 and the client 104. The STS 120 decodes the messages and verifies the identity of the parties. The STS 120 authorizes the transaction according to the verification. At operation 1012, the STS 120 sends receipt messages to the merchant 103 using its preferred connection 220 and to the customer 104 over the cellular network 211.

Figure 11:
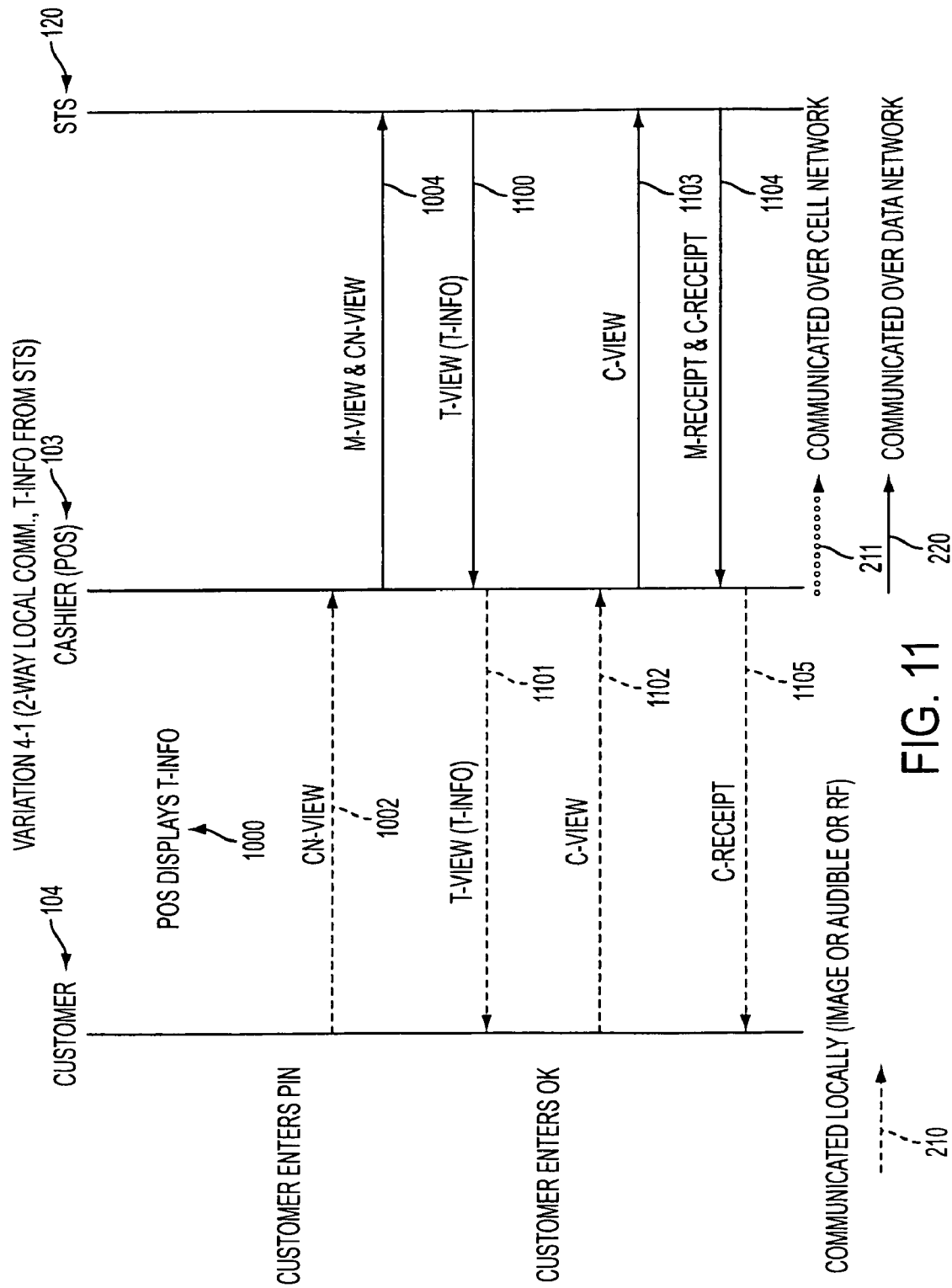
Figure 14:
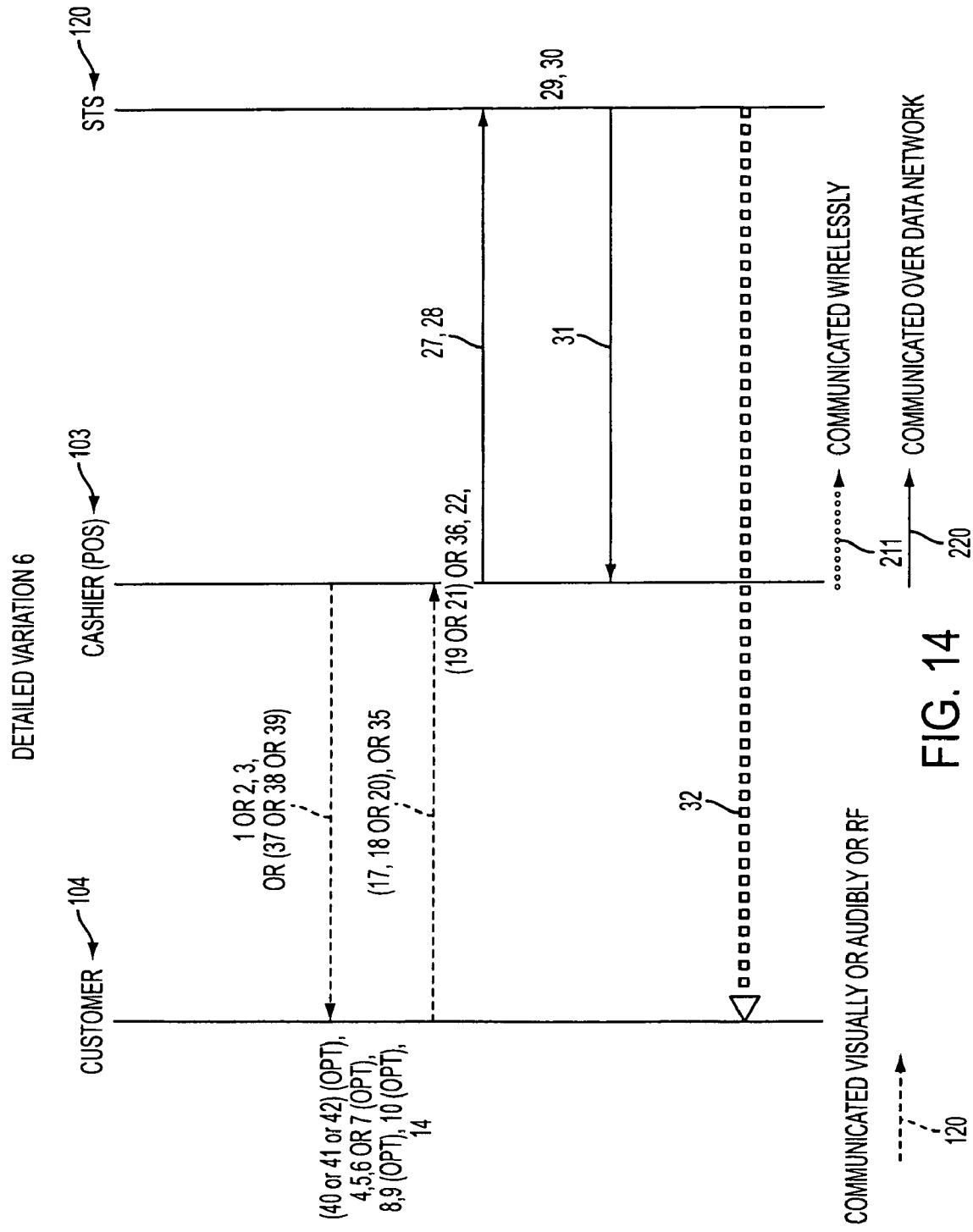

The FIG. 10 scheme has the STS 120 send the transaction details to the user for approval. It uses both remote 211 and local communication 210 with the mobile POS 104. FIG. 11 is a variation 4-1 of this scheme that transmits transaction information to/from the STS 120 and the mobile POS 104 by using, at operations 1100, 1101, 1102, 1103, 1104 and 1105, only local communication 210 with the mobile POS 104 via the POS 103.

Benefits of the mobile device 104 communication modes are described next. A benefit of the mobile POS communication mode 1 is the mobile POS 104 only needs to have an SMS plan, but does not need to have a wireless Internet access plan from a wireless communication provider, reducing communication and device cost. A benefit of the mobile POS communication mode 2 is the mobile device 104 only needs short-range communication 210, but does not need to have a wireless Internet access plan or an SMS plan, reducing communication cost. A benefit of the mobile POS communication modes 3 and 4 are to reduce and minimize (as the case may be) user input at the mobile device 104, for example, to a single input PIE corresponding to a transaction type (i.e., a purchase) specification or identification at the mobile POS 104 to conclude a transaction, such as a purchase, providing a substantial new effect of inviting a user 102 purchase.

Additional variations 5-8, mostly derived from the variations discussed above with more detailed options, are discussed with reference to FIGS. 12-16 in which the numerals refer to action numbers described herein. FIG. 12 is an action number legend 1200 for variations 5-8, according to an embodiment of the present invention. First the following lower layer actions are defined:

In FIGS. 13-16, actions 1-3 concern the information displayed by the POS 103.

Action number 1. POS 103 displays a POS Identifier. Such an identifier, e.g., a phone number or a 10-digit unique ID, could be posted on the POS itself Action number 2. POS 103 displays a transaction identifier. The transaction identifier corresponds to the TID in the UPTF message (per the Secure Agreement Submission protocol). The transaction identifier is dynamically created after the POS begins processing for a new transaction and is preferably generated after the amount of the transaction has been identified and so that the transaction identifier can be cross-referenced with the transaction amount.

Action number 3. The POS 103 displays a purchase amount.

Actions 4-10 concern the information input by the user 102 to the mobile POS 104.

Action number 4. The mobile user starts the mobile POS application 109 on the mobile device 104.

Action number 5. The mobile user selects the physical POS option on the mobile POS application 109.

Action number 6. The mobile user enters the POS identifier in the mobile POS application 109; a POS identifier is deemed as the DID of the POS 103.

Action number 7 (optional). The mobile user enters the transaction identifier in the mobile POS application 109.

Action number 8. The mobile user types her PIN in the mobile POS application 109.

Action number 9 (optional). The mobile user types the purchase amount (amount of the transaction) in the mobile POS application 109.

Action number 10 (optional). The mobile user selects an account from the cache of accounts known to the mobile POS application 109. If for some reason the chosen account is not eligible for payment, the default account (or some other alternate account of the consumer) will be used for the payment.

Actions 11-14 concern the messages and the formats created by the mobile device POS 104.

Action number 11. The mobile POS 104 creates a UPTF message for the specific POS identifier, and optionally an amount of transaction and type of transaction (payment at a physical POS).

Action number 12. The mobile POS 104 creates a UPTF message for the specific transaction identifier, and optionally an amount of transaction and type of transaction (payment at a physical POS).

Action number 13. The mobile POS 104 creates a UPTF message for the type of transaction (payment at a physical POS), without specifying the amount of the transaction, a transaction identifier or a POS identifier. When STS 120 processes this message, the STS will assume that the amount of transaction and the POS identifier (essentially the ID of the other transaction party) are those submitted in the POS's UPTF message. This is possible in a case the POS 103 transmits to the STS 120 its message 404 and the mobile phone's message 402 (hence the two messages arrive in the STS 120 together in the same action)

Action number 14. The mobile phone calculates the message digest (MD) 410 of the encrypted part of 11 or 12 or 13 (FIG. 14); the message digest of the encrypted part of the UPTF message can be much shorter than the encrypted part of the UPTF message. For example, if MD5 (a hash function) is used on the UPTF message, the MD 410 will be 16 bytes and if SHA1 is used the MD 410 is 20 bytes; by contrast, a UPTF message can vary between 100 and 1024 bytes depending on the message type and the amount of padding. The mobile POS application's 109 UPTF message has no padding in this case of using an MD; since there is no way for the STS to know the padding parameters, if the message includes padding the STS 120 will be unable to compute the complete UPTF message and then correctly compute the MD for it. The complete UPTF message comprises of the DID of the mobile POS application 109 (DID of the mobile POS 104) and the timestamp (both unencrypted) and of the aforementioned MD.

Actions 15-21 concerns the generation of the local communication 210 message by the mobile POS 104 and processing of a local communication 210 based message received by the POS 103 from the mobile POS 104.

Action number 15. The mobile POS software 109 generates a barcode representation of the message in 11 or 12 or 13. A 2-D type of barcode is used; 2-D barcodes can "encode" up to 3K bytes. The mobile POS application 109 displays the barcode on a barcode screen, for example, display the barcode on a mobile phone POS 104 display.

Action number 16. The mobile POS software 109 generates an audio signal from the message in 11 or 12 or 13.

Action number 17. The mobile POS software 109 generates a barcode or an audio signal as a series of tones (similar to the tones in touch-tone phones), from the message in action number 14 (message digest based message—FIG. 14).

Action number 18. The user of the mobile POS 104 presents the mobile POS 104 display with the displayed barcode image to a barcode reader attached to the POS 103. The merchant's POS 103 might be equipped with (or is) another mobile POS 103 with a camera that takes a picture of the barcode and either does local processing (extract barcode from image) or sends image to STS 120 for server side processing along with the other POS's message(s).

Action number 19. For example, a POS 103 barcode reader processes the displayed mobile POS 104 barcode by converting the displayed image (barcode) to a series of characters, thus reproducing the UPTF message that was used to generate the barcode in the first place.

Action number 20. The user of the mobile POS 104 starts the playback of the audio signal as she presents it to a microphone of an audio signal processing device that will process the audio signal at the POS 103 or sends the same for processing to the STS 120.

Action number 21. For example, the audio signal processing device at the POS 103 processes the audio signal and converts it to a series of characters, thus reproducing the UPTF message that was used to generate the audio signal in the first place.

Action Number 22 concerns the message generated by the POS 103 to the STS 120. At action number 22, the POS 103 generates its UPTF message for the transaction. The UPTF message does not include the device ID of the mobile phone. This device ID can be inferred by the mobile phone's UPTF message since the POS transmits to the STS its message and the mobile phone's message (hence the two message arrive in the STS together in the same action).

Figure 15:
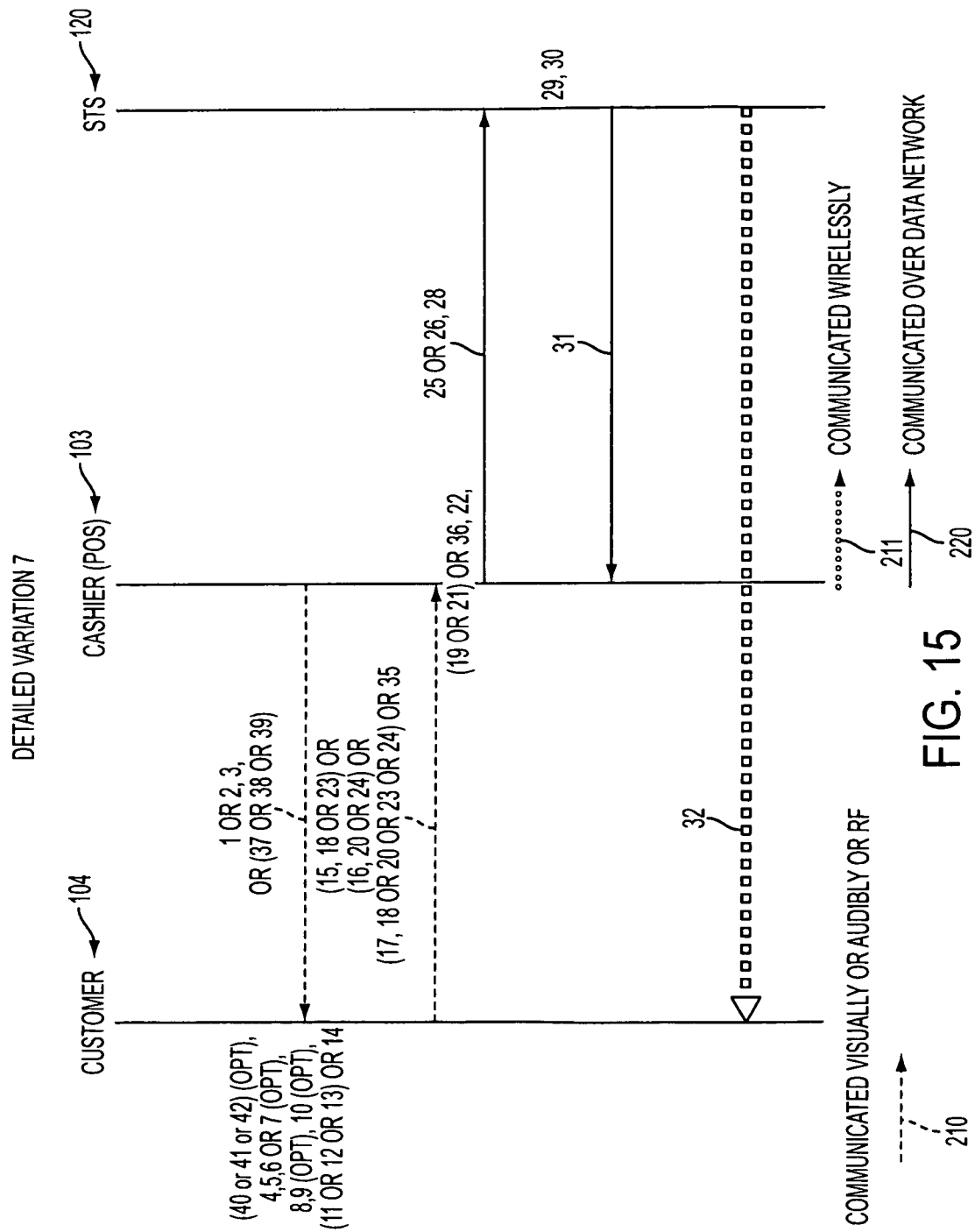

Action numbers 23-26 concern the reception of the local communication by the POS with reference to FIG. 15.

Action number 23. The mobile POS 104 user presents the mobile POS's 104 display to a camera that captures the mobile POS's display (as an image); the camera is attached to the POS 103.

Action number 24. The mobile POS 104 user presents the mobile POS's speaker to a microphone that captures (records) the mobile POS's audio signal (as an audio signal); the microphone is attached to the POS 103.

Action number 25. The camera of 23 transmits the captured image to the STS 120 alongside with the UPTF message generated by the POS 103.

Action number 26. The microphone of 24 transmits the captured audio to the STS 120 alongside the UPTF message generated by the POS 103.

Action numbers 27-32 concern the processing of the messages by the STS 120 and the replies back from the STS 120 to the POS 103 and mobile POS 104.

Action number 27. The Secure Transaction Server (STS) receives a UPTF message from the mobile POS software 109 which was transmitted by the POS 103.

Action number 28. The STS 120 receives a UPTF message from the POS 103, which was transmitted by the POS 103.

Action number 29. The STS 120 compares the mobile POS 104 and POS 103 messages 402, 404, and processes them according to the SAS protocol.

Action number 30. The STS 120 determines whether the transaction should be authorized, according to the SAS protocol.

Action number 31. The STS 120 sends a confirmation UPTF message for the transaction to the POS 103.

Action number 32. The STS 120 sends a confirmation SMS message for the transaction to the mobile POS 104 of the consumer 102.

Figure 16:
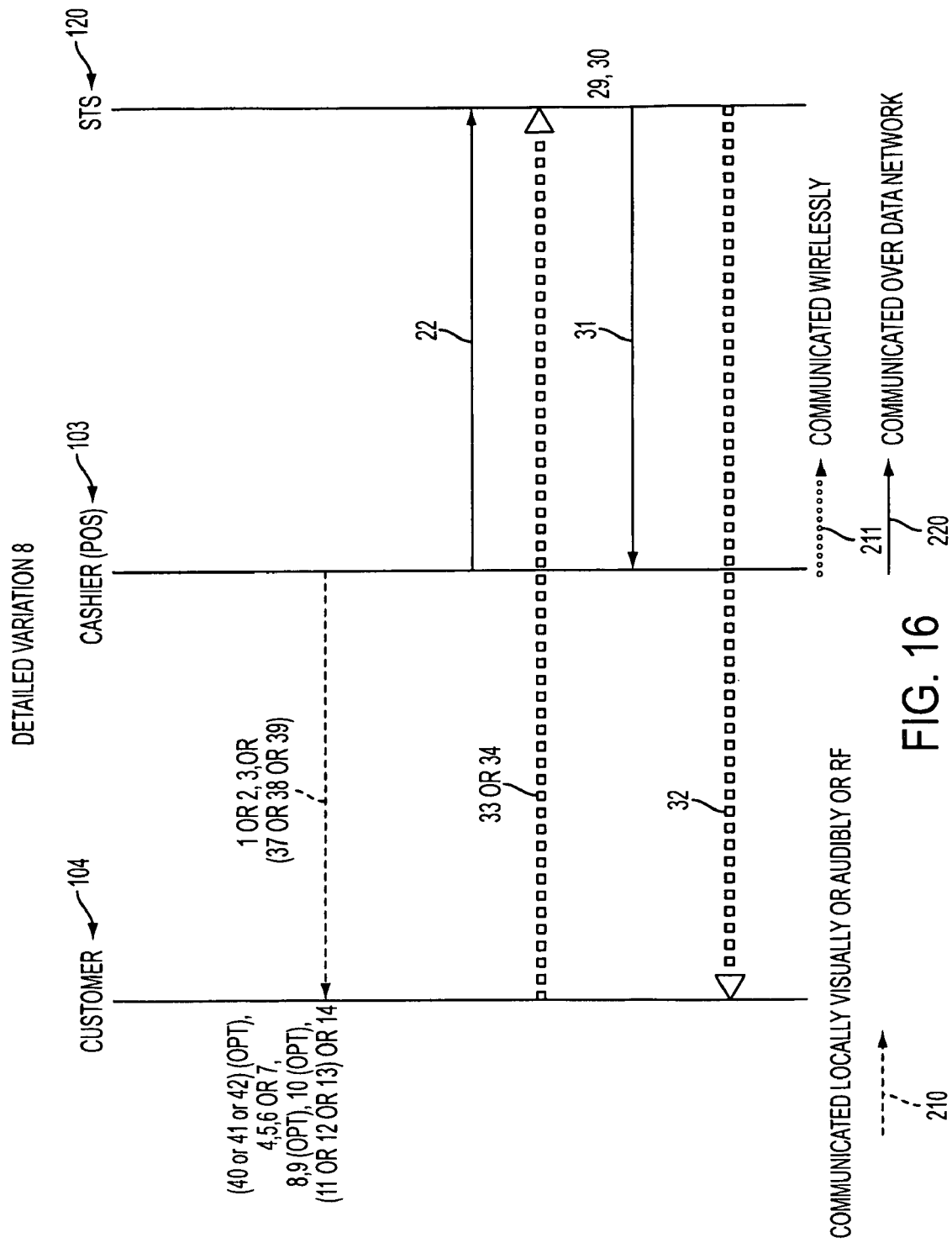

Action numbers 33-34 concern the use of SMS or MMS to transmit messages with reference to FIG. 16.

Action number 33. The mobile POS application 109 sends a SMS to the STS 120 adding to its content the message of 11 or 12 or 13 or 14. The encrypted part of the message is preferably encoded in HEXadecinal Action number 34. The mobile POS application 109 sends a MMS to the STS 120 adding to its content the message of 11 or 12 or 13 or 14. The encrypted part of the message is preferably encoded in HEXadecinal.

Actions 35-36 concern the use of RF as the local communication medium 210.

35. The user of the WW sends a local communication to the POS using a short range RF device such as an RF ID, Bluetooth, UWBV or WiFi. The WW software generates an RF signal from the message in 11 or 12 or 13 or 14.

36. The POS will recognize the RF communication and will receive the UPTF message. The POS 103 will determine whether the message is intended for this POS by matching included information in the unencrypted portion 408 of the UPTF SAS message 402, such as transaction ID or POS ID.

Action numbers 37-42 concern local communication from the POS 103 to the mobile POS 104.

Action number 37. The POS 103 will display on its monitor a barcode representing information contained in 1, 2, or 3 as local communication 210 to the mobile POS software 109.

Action number 38. The POS 103 will play on its speaker audio signals representing information contained in 1, 2, or 3 as local communication 210 to the mobile POS software 109.

Action number 39. The POS 103 will transmit on its RF signals on its local RF transmitter device representing information contained in 1, 2, or 3 for local communication to the mobile POS software 109.

Action number 40. The camera on the mobile POS 104 and a software module decodes a barcode displayed by the POS 103 for local communication 210 of information contained in 1, 2 or 3 to the mobile POS 104.

Action number 41. The microphone on the mobile POS 104 and a software module decodes an audio signal from the POS 103 for local communication 210 of information contained in 1, 2 or 3.

Action number 42. The local RF receiver device on the mobile POS 104 and a software module receives a local RF signal from the POS 103 for local communication 210 of information contained in 1, 2 or 3.

Another variation is the following. The mobile POS 104 is equipped with a RFID chip (any type of RFID tag; passive, active, or any combinations thereof) or Near Field Communication (NFC) chip. This addition might be simply attached to the mobile device 104, without being integrated to the circuitry of thereof, or it might be part of the circuitry thereof. In the latter case the software 109 of the mobile device 104 can communicate with the RFID or NFC chip. In the former case, the software 109 of the mobile device 104 might not communicate with the RFID or NFC chip; for example the RFID or NFC chip might be issued by the issuer of the mobile POS software 109 and be attached (physically) (e.g., via adhesive or other coupling technology) to the mobile device 104. When the user performs a transaction, the RFID reader at the POS 103 reads the RFID or NFC presence and thus identifies the transacting party. The owner of the mobile POS 104 using the mobile POS software 109 further confirms the transaction, for example, via remote communication with the STS 120. The POS 103 upon reading the RFID or NFC identifier transmits its UPTF message to the STS 120 and the STS 120 waits for the consumer's confirmation and/or authorization UPTF message to arrive from the mobile device 104. In the meantime, the consumer starts the mobile POS application 109, types in a PIN resulting in the mobile POS software 109 transmission of the appropriate UPTF message to the STS 120. Upon STS 120 receipt of this message, the STS 120, according to the UPTF protocol, approves or disapproves the transaction and notifies the transacting parties accordingly. According to an aspect of the embodiments, the STS 120 can authenticably approve the transaction, because the STS 120 has correlated the PIN and the mobile device 120 as identified by the RFID or the NFC. This case requires a wireless transmission of the UPTF message from the mobile device 104 to the STS 120. Alternatively, the mobile POS software 109 may display a barcode or image (as previously discussed) that is processed by the POS 103 (as previously discussed). The advantage of this variation is that it increases the security of using the RFID or NFC alone for purchasing. Alternatively, if the RFID or NFC, is capable of two-way communication and it is integrated with the circuitry of the mobile POS 104, the transmission of the UPTF message from the mobile POS 104 to the POS 103 is transmitted over the RFID or NFC, upon entering of the PIN (on the mobile device 104) by the consumer 102.

A method, and apparatus and computer readable medium, thereof, comprises providing a secure transaction server (STS); providing an authentic point of sale (POS) device, according to a first authentication parameter of the STS; providing an authentic mobile purchasing device, according to a second authentication parameter of the STS; providing a short-range communication method between the POS device and the mobile purchasing device; correlating by the STS a personal identification entry (PIE) and the authentic mobile purchasing device; transmitting, by the POS device, a time dependent transformed secure POS authenticable POS purchase action to the STS; inputting (e.g., by a user and/or automatically from a computer readable medium, such as memory, etc.) the PIE to the mobile purchasing device to transmit a time dependent transformed secure user authenticable POS purchase action to the POS device via the short-range communication method; and approving, by the STS, the POS purchase action for the POS device and for the mobile purchasing device, according to the authentic POS device, and according to the authentic mobile purchasing device and the STS correlating of the PIE and the authentic mobile purchasing device.

An apparatus, comprises means for providing an authentic point of sale (POS) device; means for providing an authentic mobile purchasing device; means for a short-range communication between the authentic POS device and the authentic mobile purchasing device to transmit a time dependent POS purchase action to the authentic POS device; means for receiving the time dependent POS purchase action and for authenticating and verifying the time dependent POS purchase action for the POS device and for the mobile purchasing device, according to the authentic POS device and the authentic mobile purchasing device. According to an aspect of the embodiments, the means for providing the authentic POS, the authentic purchasing device, and the authenticating and verifying the time dependent POS purchase action is the UPTF SAS protocol.

According to an aspect of the embodiment, the POS device 103 and the mobile purchasing device 104 become authentic and the transaction messages become authenticable, according to the STS correlation of each device with respective PIEs, time dependency (for example, use of the Time Stamp in generating the key 352 as described herein), and the STS authentication parameter. According to an aspect of the embodiment, the expression "transmitting" refers to communicating or conveying information or knowledge via an image (e.g., a bar code image), audio, or wireless communication connectivity technology, as described herein. So according to an aspect of the embodiments, for example, in case of a bar code image displayed on the display of the mobile device 104 or in case of audio as the short-range communication method, the transmitting a time dependent transformed secure user authenticable POS purchase action to the POS device comprises generating a bar code image or audio that is a representation of a UPTF SAS protocol transaction message view 402 or 404 as a time dependent transformed secure authenticable transaction message, thus providing a time dependent image or audio to prevent reuse of image or audio for replay or fraudulent transactions.

In view of the above described examples of preferred embodiments, an apparatus 104 suitable for use in implementing the embodiments described herein can be any computing apparatus or machine, such as (in an unlimiting example) a programmable device that can store, retrieve, and process data, allow mobile (wireless or radio) telecommunication with other computing devices and have one or more communicably connected components of computer/computing processors, such as Central Processing Units (CPUs); input unit(s)/device(s) (e.g., microphone for voice command/control, etc., keyboard/keypad, pointing device (e.g., mouse, pointer, stylus), touch screen, camera, scanner, etc.); output unit(s)/device(s) (e.g., computer display screen (including user interface thereof, such as graphical user interface), speaker(s), printer(s), etc.); computer network interface(s), including known communication protocols thereof, (e.g., mobile telephone (voice/data (Internet)) (cellular radio networks, satellite, etc.) network, radio frequency technology, local area network, etc.); and recording media to store information/instructions, such as software (e.g., operating system, wireless wallet software, etc.) and/or data (any known recording media, such as volatile and/or non-volatile memory (Random Access Memory), hard disk, flash memory, magnetic/optical disks, etc.) for execution by a computing apparatus, such as a computer/computing processor and/or electronic circuitry. The embodiments provide methods, apparatuses (computer systems) and/or computer readable media for a wireless computing apparatus/device for physical Point of Sale (POS) transactions. The POS 103 and STS 120 can be any computer.

The many features and advantages of the embodiments described herein are apparent from the detailed specification and, thus, it is intended by the appended claims and equivalents to cover all such features and advantages of the embodiments that fall within the true spirit and scope of the embodiments. Further, since modifications and changes might occur to those skilled in the art, it is not desired to limit the embodiments to the exact construction and operation illustrated and described, and accordingly all suitable modifications and equivalents may be resorted to, falling within the scope of the embodiments.

What is claimed is:

1. A method, comprising:
providing a secure transaction server (STS);
providing a point of sale (POS) device;
providing an authentic mobile purchasing device, according to an authentication parameter of the STS;
providing a short-range communication method between the POS device and the mobile purchasing device;
correlating by the STS a personal identification entry (PIE) and the authentic mobile purchasing device;
transmitting, by the POS device, a POS purchase action that is POS device authenticable as a POS authenticable POS purchase action to the STS;
generating, by the mobile purchasing device, a POS purchase action that is user and mobile purchasing device authenticable by generating a time dependent transformed secure user and mobile purchasing device authenticable POS purchase action based upon both the PIE as input by the user to the authentic mobile purchasing device and a time dependent parameter generated based upon the authentication parameter of the authentic mobile purchasing device;
transmitting, by the authentic mobile purchasing device, the time dependent transformed secure user and mobile purchasing device authenticable POS purchase action to the POS device via the short-range communication method; and
approving, by the STS, the POS purchase action for the POS device and for the authentic mobile purchasing device, according to the authentic POS device, and according to the authentic mobile purchasing device and the STS correlating of the PIE and the authentic mobile purchasing device.

2. The method of claim 1, wherein the short-range communication method comprises one or more of an image, audio, or wireless communication connectivity technology, or any combinations thereof.

3. The method of claim 2, wherein the image as a short-range communication method comprises any type of barcode system, a camera system, a scanner system, or any combinations thereof at the POS device and/or at the mobile purchasing device.

4. The method of claim 3, wherein the barcode system processes 2-Dimensional barcodes.

5. The method of claim 2, wherein the audio as the short-range communication method is any output audio signal or Dual Tone Multi-Frequency tone, or voice, or any combinations thereof, and recognizer(s) thereof, at the POS device and/or at the mobile purchasing device.

6. The method of claim 2, wherein the Radio Frequency (RF) as the short-range communication method is any type of wireless communication connectivity technology, including one or more of Radio Frequency Identification (RFID), Bluetooth, WLAN, Near Field Communication (NFC), or any combinations thereof, at the POS device and/or at the mobile purchasing device.

7. The method according to claim 6, wherein the mobile purchasing device comprises the RFID and/or the NFC as integrated with device circuitry or attached to the mobile purchasing device independent of the mobile purchasing device circuitry.

8. The method of claim 1, wherein the POS purchase action is a POS identifier or a purchase transaction identifier.

9. The method of claim 1, wherein the POS purchase action is a single user conformation of a purchase.

10. The method according to claim 1, wherein the POS purchase action further comprises a mobile purchasing device identifier and the method further comprises calculating, by the mobile purchasing device, a message digest based upon the mobile purchasing device identifier and the POS identifier, a transaction identifier or a single purchase specification, and transmitting the message digest to the POS device via the short-range communication method.

11. The method of claim 1, further comprising transmitting, by the POS device via the short-range communication method, the POS purchase action to the mobile purchasing device.

12. The method of claim 1, wherein the POS purchase action identifies a payment for a good and/or a service.

13. The method of claim 1, further comprising transmitting, by the POS device, via a short message service, or a multimedia message service, or any combinations thereof, the time dependent transformed secure user and mobile purchasing device authenticable POS purchase action to the STS.

14. The method of claim 1, further comprising transmitting, by the POS device, via a network the time dependent transformed secure user and mobile purchasing device authenticable POS purchase action and the POS authenticable POS purchase action to the STS for the approving of the POS purchase action.

15. The method of claim 14, wherein the approving comprises verifying a match between the time dependent transformed secure user and mobile purchasing device authenticable POS purchase action and the POS authenticable POS purchase action.

16. The method of claim 15, wherein the approving comprises transmitting by the STS via a short message service, or a multimedia message service, or any combinations thereof, a POS receipt to the mobile purchasing device.

17. The method of claim 1, wherein the approving comprises settling by the STS a payment to the POS for the POS purchase action.

18. The method of claim 1, wherein the POS device is a mobile POS device, and the method further comprises:
correlating by the STS a POS personal identification entry (PIE) and the mobile POS device;
inputting, by another user, the POS PIE and a POS purchase action, to the mobile POS device to transmit a time dependent transformed secure POS authenticable POS purchase action to the STS; and
approving, by the STS, the POS purchase action for the mobile POS device and POS purchase action for the mobile purchase device, according to the STS correlating of the POS PIE and the mobile POS device and according to the STS correlating of the PIE and the authentic mobile purchasing device.

19. The method of claim 1, wherein the authentication parameter is per-message resettable.

20. An apparatus, comprising:
a secure transaction server (STS);
a point of sale (POS) device communicatively connectable with the STS; and
an authentic mobile purchasing device, according to an authentication parameter of the STS, and the authentic mobile purchasing device communicatively connectable with the authentic POS device via a short-range communication method,
wherein the POS device transmits a POS purchase action that is POS device authenticable as a POS authenticable POS purchase action to the STS;

wherein the STS correlates a personal identification entry (PIE) and the authentic mobile purchasing device, wherein the mobile purchasing device generates a POS purchase action that is user and mobile purchasing device authenticable by generating a time dependent transformed secure user and mobile purchasing device authenticable POS purchase action based upon both the PIE as input by the user to the authentic mobile purchasing device and a time dependent parameter generated based upon the authentication parameter of the authentic mobile purchasing device and transmits the generated POS purchase action to the POS device via the short-range communication method between the POS device and the authentic mobile purchasing device, and wherein the STS approves the POS purchase action for the POS device and for the authentic mobile purchasing device, according to the authentic POS device, and according to the authentic mobile purchasing device and the STS correlating of the PIE and the authentic mobile purchasing device.

21. The apparatus of claim 20, wherein the short-range communication method comprises one or more of an image, audio, or wireless communication connectivity technology, or any combinations thereof.

22. An apparatus, comprising:
a secure transaction server (STS);
a point of sale (POS) device communicatively connectable with the STS; and
an authentic mobile purchasing device, according to an authentication parameter of the STS, and the authentic mobile purchasing device comprising a radio frequency identification tag attached thereto to communicatively connect with the authentic POS device, wherein the POS device transmits a POS purchase action that is POS device authenticable as a POS authenticable POS purchase action to the STS;

wherein the STS correlates a personal identification entry (PIE) and the authentic mobile purchasing device, wherein the mobile purchasing device generates a POS purchase action that is user and mobile purchasing device authenticable by generating a time dependent transformed secure user and mobile purchasing device authenticable POS purchase action based upon both the PIE as input by the user to the authentic mobile purchasing device and a time dependent parameter generated based upon the authentication parameter of the authentic mobile purchasing device and transmits the generated POS purchase action to the STS via mobile phone network, a short message service, or a multimedia message service, or any combinations thereof, and wherein the STS approves the POS purchase action for the POS device and for the authentic mobile purchasing device, according to the authentic POS device, and according to the authentic mobile purchasing device and the STS correlating of the PIE and the authentic mobile purchasing device.

23. An apparatus, comprising:
means for providing a point of sale (POS) device;
means for providing an authentic mobile purchasing device;
means for a short-range communication between the POS device and the authentic mobile purchasing device;
means for generating a POS purchase action that is POS device authenticable;
means for generating a POS purchase action that is user and mobile purchasing device authenticable based upon a generated time dependent transformed secure user and mobile purchasing device authenticable POS purchase action; and
means for authenticating the POS purchase actions for the POS device and the authentic mobile purchasing device.

* * * * *

UNITED STATES PATENT AND TRADEMARK OFFICE
CERTIFICATE OF CORRECTION

| | | |
|---|---|---|
| PATENT NO. | : 7,784,684 B2 | Page 1 of 1 |
| APPLICATION NO. | : 11/488178 | |
| DATED | : August 31, 2010 | |
| INVENTOR(S) | : Yannis Labrou et al. | |

It is certified that error appears in the above-identified patent and that said Letters Patent is hereby corrected as shown below:

On the Title Page, Item (63) (Related to U.S. Application Data), Line 9, after "Jul. 29, 2003," delete "now U.S. Pat. No. 7,349,871," and insert the same on First Page, Col. 1, Line 7 before "Jul. 29, 2009, and".

Column 1, Line 34-35, After "Jul. 29, 2003" delete "now U.S. Pat. No. 7,349,871," and insert the same on Col. 1, Line 31 before "which claims".

Signed and Sealed this
Tenth Day of January, 2012

David J. Kappos
*Director of the United States Patent and Trademark Office*